US009807590B2

(12) United States Patent
Pinheiro et al.

(10) Patent No.: US 9,807,590 B2
(45) Date of Patent: Oct. 31, 2017

(54) TECHNIQUES TO FACILITATE DUAL CONNECTIVITY

(71) Applicant: Intel IP Corporation, Santa Clara, CA (US)

(72) Inventors: Ana Lucia A. Pinheiro, Breinigsville, PA (US); Yujian Zhang, Beijing (CN); Candy Yiu, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/770,141

(22) PCT Filed: Dec. 23, 2013

(86) PCT No.: PCT/US2013/077521
§ 371 (c)(1),
(2) Date: Aug. 25, 2015

(87) PCT Pub. No.: WO2014/158273
PCT Pub. Date: Oct. 2, 2014

(65) Prior Publication Data
US 2016/0014836 A1 Jan. 14, 2016

Related U.S. Application Data

(60) Provisional application No. 61/806,821, filed on Mar. 29, 2013.

(51) Int. Cl.
*H04W 76/02* (2009.01)
*H04W 8/08* (2009.01)
(Continued)

(52) U.S. Cl.
CPC .............. *H04W 8/082* (2013.01); *H04B 1/56* (2013.01); *H04B 7/0417* (2013.01);
(Continued)

(58) Field of Classification Search
CPC ........... H04W 52/241; H04W 76/0225; H04W 84/045; H04W 88/10; H04W 84/042
See application file for complete search history.

(56) References Cited

U.S. PATENT DOCUMENTS

2013/0242909 A1* 9/2013 Kim ...................... H04W 72/08
370/329
2015/0055621 A1* 2/2015 Koskinen .............. H04W 36/18
370/331

OTHER PUBLICATIONS

International Search Report and Written Opinion received for PCT Patent Application No. PCT/US2013/077521, dated Apr. 22, 2014, 13 pages.
(Continued)

*Primary Examiner* — Anez Ebrahim

(57) ABSTRACT

Examples are disclosed for facilitating dual connectivity for user equipment (UE) in a wireless network. The examples include establishing a backhaul link between base stations serving as primary and secondary cells for separate UE connections to management or gateway entities for the wireless network. The primary base station may provide macro cell coverage for the one or more UEs while the secondary base station may provide small cell coverage. The two base stations may split at least some protocol stack processing for radio bearers associated with the separate UE connections. Control information may be exchanged through the backhaul link to facilitate the split protocol stack processing. Other examples are described and claimed.

25 Claims, 15 Drawing Sheets

(51) Int. Cl.
| | | |
|---|---|---|
| H04L 5/00 | (2006.01) | |
| H04B 1/56 | (2006.01) | |
| H04B 7/06 | (2006.01) | |
| H04W 48/16 | (2009.01) | |
| H04W 36/30 | (2009.01) | |
| H04W 24/00 | (2009.01) | |
| H04W 36/26 | (2009.01) | |
| H04W 48/18 | (2009.01) | |
| H04B 7/0417 | (2017.01) | |
| H04W 36/00 | (2009.01) | |
| H04W 36/22 | (2009.01) | |
| H04L 1/18 | (2006.01) | |
| H04W 24/02 | (2009.01) | |
| H04W 72/04 | (2009.01) | |
| H04W 72/08 | (2009.01) | |
| H04W 28/20 | (2009.01) | |
| H04L 29/06 | (2006.01) | |
| H04M 1/725 | (2006.01) | |
| H04W 4/02 | (2009.01) | |
| H04W 8/02 | (2009.01) | |
| H04W 8/06 | (2009.01) | |
| H04W 28/02 | (2009.01) | |
| H04W 48/06 | (2009.01) | |
| H04L 25/03 | (2006.01) | |
| H04N 21/24 | (2011.01) | |
| H04N 21/845 | (2011.01) | |
| H04N 21/8543 | (2011.01) | |
| H04B 7/0452 | (2017.01) | |
| H04B 7/08 | (2006.01) | |
| H04L 25/02 | (2006.01) | |
| H04W 36/08 | (2009.01) | |
| H04W 48/12 | (2009.01) | |
| H04W 88/08 | (2009.01) | |
| H04W 84/04 | (2009.01) | |
| H04W 88/10 | (2009.01) | |
| H04W 84/12 | (2009.01) | |
| H04W 88/02 | (2009.01) | |
| H04W 28/08 | (2009.01) | |

(52) U.S. Cl.
CPC ........... *H04B 7/0452* (2013.01); *H04B 7/063* (2013.01); *H04B 7/0619* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 25/0206* (2013.01); *H04L 25/03305* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72572* (2013.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/0226* (2013.01); *H04W 28/0289* (2013.01); *H04W 28/20* (2013.01); *H04W 36/0005* (2013.01); *H04W 36/0011* (2013.01); *H04W 36/0022* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 72/0446* (2013.01); *H04W 72/082* (2013.01); *H04W 76/025* (2013.01); *H04L 5/0007* (2013.01); *H04L 2025/03426* (2013.01); *H04W 28/085* (2013.01); *H04W 36/08* (2013.01); *H04W 48/12* (2013.01); *H04W 72/046* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(56) References Cited

OTHER PUBLICATIONS

"Discussion on U-plane architecture for dual connectivity", NTT DOCOMO, Inc., 3GPP TSG-RAN WG2 #81, R2-130324, Jan. 28-Feb. 1, 2013, 6 pages, (author unknown).

"Deployment scenarios and design goals for dual connectivity", NTT DOCOMO, Inc., 3GPP TSG-RAN WG2 #81, R2-130444, Jan. 28-Feb. 1, 2013, 7 pages, (author unknown).

"Discussion on dual connectivity for small cell", ASUSTeK, 3GPP TSG-RAN WG2 Meeting #81, R2-130292, Jan. 28-Feb. 1, 2013, 3 pages, (author unknown).

"Scenarios and benefits of dual connectivity", Intel Corporation, 3GPP TSG-RAN WG2 #81, R2-130570, Jan. 28-Feb. 1, 2013, 7 pages, (author unknown).

"Backhaul considerations for user plane architectures for dual connectivity", Qualcomm Incorporated, 3GPP TSG-RAN WG2 #81, R2-130265, Jan. 28-Feb. 1, 2013, 3 pages, (author unknown).

* cited by examiner

900

ESTABLISH, AT A SMALL CELL eNB, A BACKHAUL LINK WITH A MACRO CELL eNB VIA AN X2 INTERFACE, THE BACKHAUL LINK ESTABLISHED FOR THE SMALL CELL eNB TO SERVE AS A SECONDARY CELL FOR ONE OR MORE UES WHILE THE MACRO CELL eNB SERVES AS A PRIMARY CELL FOR THE ONE OR MORE UES
902

SPLIT PROTOCOL STACK PROCESSING BETWEEN THE SMALL CELL eNB AND THE MACRO CELL eNB FOR RADIO BEARERS ASSOCIATED WITH A CONNECTION BETWEEN AN UE AND AN EPC SUCH THAT THE SMALL CELL eNB PERFORMS PROTOCOL STACK PROCESSING ON A PORTION OF PROTOCOL STACK LAYERS EXCLUDING A PDCP LAYER
904

RECEIVE CONTROL INFORMATION FROM THE MACRO CELL eNB THROUGH THE BACKHAUL LINK VIA THE X2 INTERFACE TO FACILITATE THE PROTOCOL STACK PROCESSING ON THE PORTION OF PROTOCOL STACK LAYERS FOR A FIRST PORTION OF THE RADIO BEARERS
906

*FIG. 9*

Storage Medium 1000

Computer Executable
Instructions for 900

ESTABLISH, AT A MACRO CELL eNB, A BACKHAUL LINK WITH A SMALL CELL eNB VIA AN X2 INTERFACE, THE BACKHAUL LINK ESTABLISHED FOR THE SMALL CELL eNB TO SERVE AS A SECONDARY CELL FOR AN UE WHILE THE MACRO CELL eNB SERVES AS A PRIMARY CELL FOR THE UE
1202

SPLIT PROTOCOL STACK PROCESSING BETWEEN THE MACRO CELL eNB AND THE SMALL CELL eNB FOR RADIO BEARERS ASSOCIATED WITH A CONNECTION BETWEEN THE UE AND AN EPC SUCH THAT THE MACRO CELL eNB PERFORMS PROTOCOL STACK PROCESSING ON ALL PROTOCOL STACK LAYERS FOR A FIRST PORTION OF THE RADIO BEARERS AND PERFORMS PROTOCOL STACK PROCESSING ON A PORTION OF PROTOCOL STACK LAYERS FOR A SECOND PORTION OF THE RADIO BEARERS, THE PORTION OF PROTOCOL STACK LAYERS INCLUDING A PDCP LAYER
1204

FORWARDING CONTROL INFORMATION TO THE SMALL CELL eNB THROUGH THE BACKHAUL LINK VIA THE X2 INTERFACE TO FACILITATE THE SMALL CELL eNB PERFORMING PROTOCOL STACK PROCESSING ON THE PORTION OF PROTOCOL STACK LAYERS FOR THE SECOND PORTION OF RADIO BEARERS
1206

FIG. 12

Storage Medium 1300

*Computer Executable Instructions for 1200*

*FIG. 13*

TECHNIQUES TO FACILITATE DUAL CONNECTIVITY

RELATED CASE

This application claims priority to U.S. Provisional Patent Application No. 61/806,821, filed on Mar. 29, 2013, incorporated by reference in its entirety.

TECHNICAL FIELD

Examples described herein are generally related to wireless communication devices.

BACKGROUND

Small cells, which may include but are not limited to picocells or femtocells, may be deployed to serve user equipment (UEs) located within one or more larger macro cells in a wireless network. These small cells may be offered or provided by low power base stations deployed to cope with locations within the one or more macro cells that may have higher concentrations of UEs such as an office complex, collage campus, an urban core or a sports arena. Small cells may also be deployed to possibly boost data throughputs in locations that may experience weaker signals from a given macro cell base station due to distance and/or interference. A low power base station is typically configured to have a transmit power that is lower than a transmit power for the given macro cell base station.

BRIEF DESCRIPTION OF THE DRAWINGS

FIG. 9 illustrates an example of a first logic flow.
FIG. 10 illustrates an example of a first storage medium.
FIG. 12 illustrates an example of a second logic flow.
FIG. 13 illustrates an example of a second storage medium.

DETAILED DESCRIPTION

Figure 1:
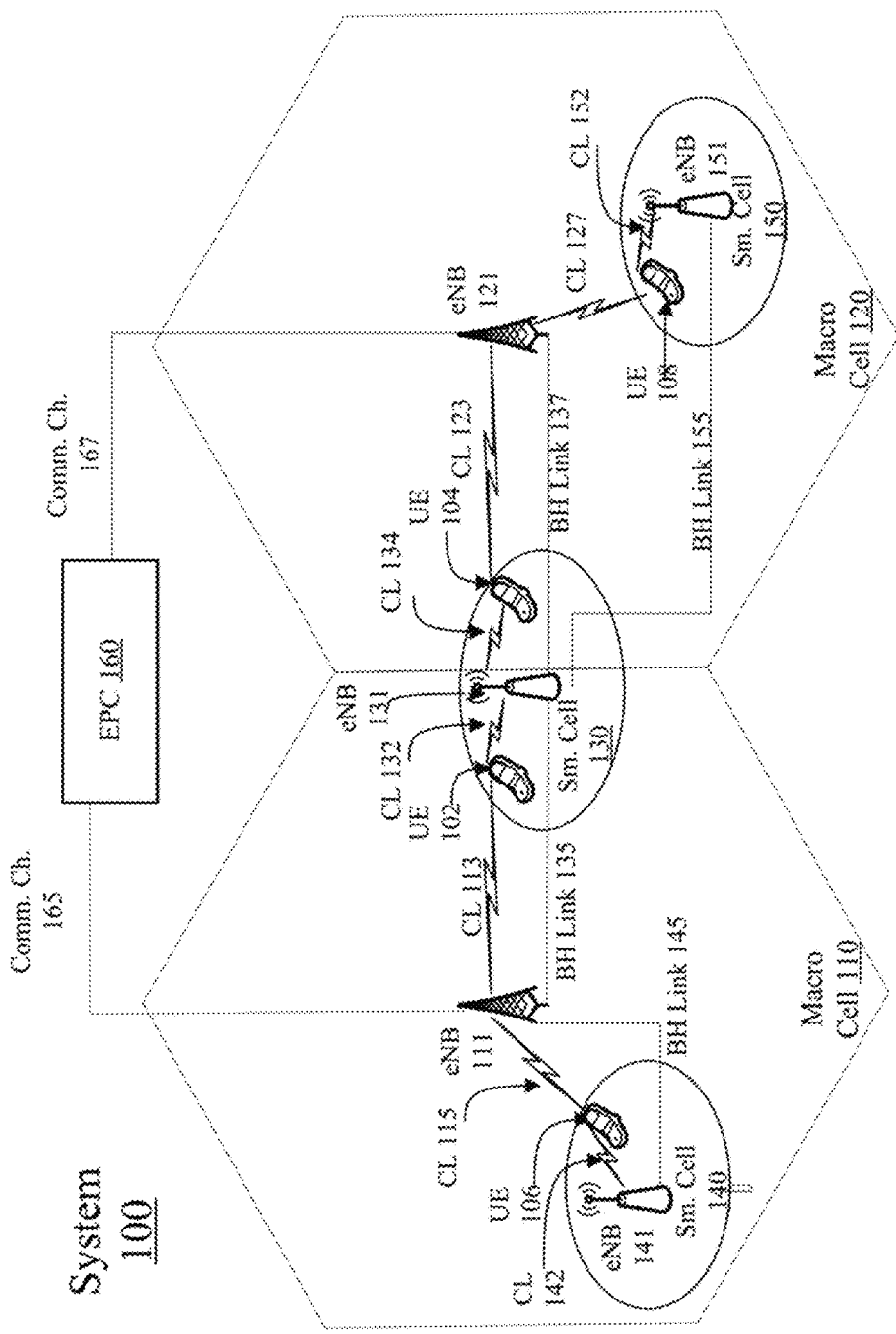
FIG. 1 illustrates an example first system.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, small cells may be deployed under macro cell coverage to provide an additional way or layer to serve UEs located within macro cells. Small cells may also be deployed at macro cell edges, in coverage holes of macro cells or, generally speaking, areas where macro cell coverage can be expected to be poor for UEs located at these areas. The macro cell may be provided by a base station arranged to operate as an evolved Node B (eNB) according to one or more 3GPP LTE Specifications including LTE-A (hereinafter referred to as a "macro cell eNB"). Also, smalls cells may be provided by another, relatively low power base station also arranged to operate as an eNB according to one or more 3GPP LTE Specifications including LTE-A (hereinafter referred to as a "small cell eNB"). In some examples, a UE may be wirelessly connected to both a macro cell eNB and a small cell eNB concurrently. This concurrent connection may be called a dual connection or dual connectivity. Dual connectivity may be similar to inter-eNB carrier aggregation (CA). The examples, however, are not limited in this respect.

According to some examples, dual connectivity for a UE between a macro cell eNB and a small cell eNB may result in the macro cell eNB serving as a primary cell for the UE while the small cell eNB serves as the secondary cell. Also, in some examples, the primary cell or macro cell eNB may be in communication with elements of an evolved packet core (EPC) that may be arranged to operate according to one or more 3GPP LTE specifications including LTE-A. Meanwhile the secondary cell or small cell eNB may communicate indirectly to the EPC through a backhaul link with the primary cell via an X2 interface. This indirect communication between the small cell eNB and the EPC may result in radio bearers associated with a connection between the UE and the EPC being split for at least some protocol stack processing at both the macro cell and small cell eNBs. Splitting protocol stack processing for at least some of the radio bearers may require new types of control information to be communicated between the macro cell eNB serving as the primary cell and the small cell eNB serving as the secondary cell. The control information may be communicated through the backhaul link via separate X2 interfaces maintained at both the macro cell and small cell eNBs. It is with respect to these and other challenges that the examples described herein are needed.

In some examples, techniques are implemented to facilitate dual connectivity for one or more UEs. The techniques may include establishing, at a small cell eNB, a backhaul link with a macro cell eNB via an X2 interface. The backhaul link may be established for the small cell eNB to serve as a secondary cell for the one or more UEs while the macro cell eNB serves as a primary cell for the one or more UEs. The techniques may also include splitting protocol stack processing between the small cell eNB and the macro cell eNB for radio bearers associated with a connection between an UE and an evolved packet core (EPC) such that the small cell eNB performs protocol stack processing on a portion of protocol stack layers excluding a protocol data convergence protocol (PDCP) layer. The techniques may also include receiving control information from the macro cell eNB through the backhaul link via the X2 interface. The control information may facilitate the protocol stack processing at the small cell eNB on the portion of protocol stack layers for a first portion of the radio bearers.

FIG. 1 illustrates an example of a first system. In some examples, as shown in FIG. 1, the first system includes system 100. System 100 may be part of a wireless network operated according to one or more 3GPP specifications including LTE-A. As shown in FIG. 1, system 100 includes macro cells 110, 120 and small cells 130, 140 and 150. Also, as shown in FIG. 1, macro cells 110, 120 and small cells 130, 140 and 150 may each include eNBs 111, 121, 131, 141 and 151, respectively. According to some examples, small cells 130, 140 or 150 may represent micro, pico or femto cells deployed under macro cell 110 and/or macro cell 120 coverage. As described more below, UEs such as UEs 102, 104, 106 or 108 may be capable of dual connections between a macro cell eNB and a small cell eNB and may also be capable of operating according to one or more 3GPP specifications including LTE-A.

According to some examples, as shown in FIG. 1, eNB 111 may be coupled or interconnected with eNBs 131 and 141 via backhaul (BH) links 135 and 145, respectively Also eNB 121 may be coupled or interconnected with eNBs 131 and 141 via BH links 137 and 155, respectively. For these examples, eNBs 111, 121, 131, 141 and 151 may communicate through these backhaul channels via an X2 interface.

Also as shown in FIG. 1, eNBs 111 and 121 may couple to EPC 160 through communication channels 165 and 167, respectively. For these examples, separate connections between UEs 102, 104, 106 or 108 with EPC 160 may be routed through either eNB 111's communication channel 165 or eNB 121's communication channel 167 with EPC 160. In some examples, protocol stack processing for radio bearers associated with separate connections between UEs 102, 104, 106 or 108 with EPC 160 may be split between a macro cell eNB and a small cell eNB. For these examples, macro cell eNBs 111 or 121 may be serve as a primary cell for at least one of UEs 102, 104, 106 or 108 while small cell eNBs 130, 140 or 150 may serve as a secondary cell for at least one of these UEs. This primary/secondary cell serving may result in a dual connection. However, UEs 102, 104, 106 or 108 may each be capable of maintaining a connection with EPC 160 via macro cell eNB 111 or macro cell eNB 121 and thus a dual connection is not always required to maintain a connection with EPC 160.

According to some examples, as shown in FIG. 1, several possible dual connections for various UEs are depicted. For example, UE 102 may have respective wireless communication links (CLs) 113 and 132 with eNBs 111 and 131. UE 104 may have respective CLs 123 and 134 with eNBs 121 and 131. UE 106 may have respective CLs 127 and 152 with eNBs 121 and 151. UE 108 may have respective CLs 115 and 142 with eNBs 111 and 141.

In some examples, some small cells may be located such that a small cell eNB may be able to serve as separate secondary cells with at least two other macro cell eNBs serving as respective separate primary cells. For example, as shown in FIG. 1, small cell 130 may be located between macro cells 110 and 120. For this example, eNB 131 may serve as a secondary cell for UE 102 while eNB 111 serves as a primary cell. Also, eNB 131 may serve as a secondary cell for UE 104 while eNB 121 serves as a primary cell.

According to some examples, as described more below, logic and/or features at small and macro cell eNBs may be configured to cause a small or macro cell eNB to perform protocol stack processing for radio bearers associated with a connection between an UE and an EPC. As part of supporting a dual connection, the protocol stack processing may be split between the small and macro cell eNBs. For these examples, the protocol stack processing may be for protocol stack layers that may include, but are not limited to, a protocol data convergence protocol (PDCP) layer, a radio link control layer (RLC), a media access control (MAC) layer or a physical (PHY) layer.

According to some examples, logic and/or features at a small cell eNB such as eNB 131 may establish a backhaul link with a macro cell eNB via an X2 interface maintained at the small cell eNB. For example, eNB 131 may establish BH 135 with eNB 111. For these examples, the backhaul link may be established for eNB 131 to serve as a secondary cell for UE 102 while eNB 111 serves as a primary cell for UE 102. Logic and/or features at eNB 131 may be capable of splitting protocol stack processing with eNB 111 for radio bearers associated with a connection between UE 102 and EPC 160 such that eNB 131 is to perform protocol stack processing on a portion of protocol stack layers that excludes a PDCP layer. Logic and/or features at eNB 131 may also be capable of receiving control information from eNB 111 through BH 135 via the X2 interface to facilitate its share of the protocol stack processing that excludes the PDCP layer.

In some examples, logic and/or features at eNB 111 may establish BH 135 with eNB 131. For these examples, eNB may serve as the primary cell for UE 102 and the logic and/or features at eNB 111 may be capable of causing eNB 111 to perform its share of split protocol stack processing on a portion of protocol stack layers that includes at least the PDCP layer for all radio bearers. Logic and/or features at eNB 131 may also be capable of forwarding control information to eNB 131 through BH link 135 via the X2 interface to facilitate eNB 131's share of the protocol stack processing that excludes the PDCP layer.

According to some examples, UEs 102, 104, 106 and 108 may be any electronic device having wireless capabilities or equipment. For some examples, UE 102 may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

Figure 2:
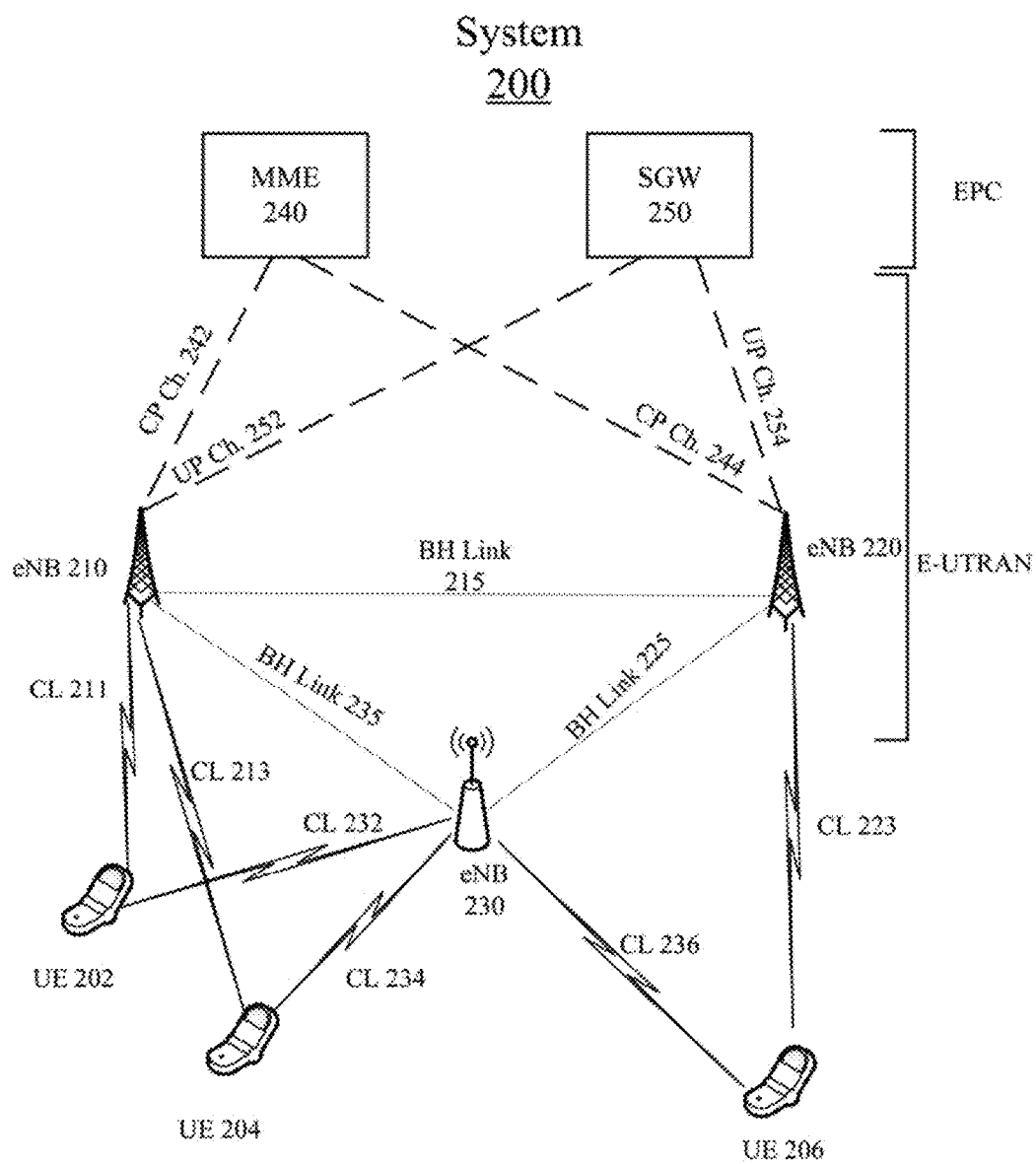
FIG. 2 illustrates an example second system.

FIG. 2 illustrates an example of a second system. In some examples, as shown in FIG. 2, the second system includes system 200. System 200 may be similar to system 100 and may be part of a wireless network operated according to one or more 3GPP Specifications including LTE-A. As shown in FIG. 2, system 200 includes UEs 202, 204, 206, eNBs 210, 220, 230, a mobility management entity (MME) 240 or a serving gateway (SGW) 250. According to some examples, as shown in FIG. 2, MME 240 and SGW 250 may be part of an EPC for the LTE-compliant wireless network and eNBs 210 and 220 may be part of an evolved universal terrestrial radio access network (E-UTRAN) for the LTE-compliant wireless network. For these examples, eNBs 210 and 220 may be macro cell eNBs capable of serving as primary cells for a UEs 202, 204 or 206.

According to some examples, as shown in FIG. 2, eNBs 210, 220 and 230 may be coupled or interconnected via BH links 215, 225 and 235. For these examples, eNBs 210, 220 and 230 may include logic and/or features capable of communicating through BH links 215, 225 or 235 via an X2 interface. In some examples, BH links 215, 225 or 235 may include wired and/or wireless communication mediums configured to enable eNBs 210, 220 and 230 to communicate via the X2 interface.

In some examples, as shown in FIG. 2, eNBs 210 and 220 may be coupled with MME 240 through control plane (CP) channels 242 and 244, respectively. For these examples, eNBs 210 and 220 may each include logic and/or features capable of communicating through CP channels 242 or 244 via an S1-MME interface. In some examples, CP channels 242 or 244 may include wired and/or wireless communication mediums configured to enable eNBs 210 or 220 to communicate with MME 240 via the respective S1-MME interfaces. Information communicated may include control information to maintain an EPC connection with one or more UEs. Other information communicated may originate from MME 240 and may include information to manage or control operating parameters for eNBs 210, 220, 230 or UEs 202, 204 or 206.

According to some examples, as shown in FIG. 2 eNBs 210 and 220 may be coupled with SGW 240 through user plane (UP) channels 252 and 254, respectively. For these examples, eNBs 210 and 220 may each include logic and/or features capable of communicating through UP channels 252 or 254 via an S1-U interface. In some examples, UP channels 252 or 254 may include wired and/or wireless communication mediums configured to enable eNBs 210 or 220 to communicate with SWG 250 via respective S1-U interfaces. For these examples, data traffic originating from or destined to UEs may be routed through one or more communication links established with a given macro cell eNB. Data traffic may be routed through a given user plane channel between the given macro cell eNB and SGW 250 via that given macro cell eNB's S1-U interface. For example, as shown in FIG. 2, UE 202 may have established CL 211 with eNB 210. Data traffic originating from or destined to UE 202 may be routed through CL 211 then through UP channel 256 to SWG 250 via eNB 210's S1-U interface.

In some examples, UEs 202, 204 or 206 may each include logic and/or features to communicate with one or more eNBs via an LTE air interface or LTE Uu interface. For example, UE 202 may communicate through CL 211 with eNB 210 or through CL 232 with eNB 230 via an LTE Uu interface. UE 204 may communicate through CL 213 with eNB 210 or through CL 234 with eNB 230 via an LTE Uu interface. Also, UE 206 may communicate through CL 223 with eNB 220 or through CL 236 with eNB 230 via an LTE Uu interface.

According to some examples, as described more below, eNB 230 may serve as a secondary cell for UEs 202, 204 and 206 while either eNB 210 or eNB 220 serve as a primary cell. For these examples, eNB 230 may receive control information via BH link 235 or BH link 225 to facilitate protocol stack processing for radio bearers associated with separate EPC connections between UEs 202, 204 and 206.

Figure 3:
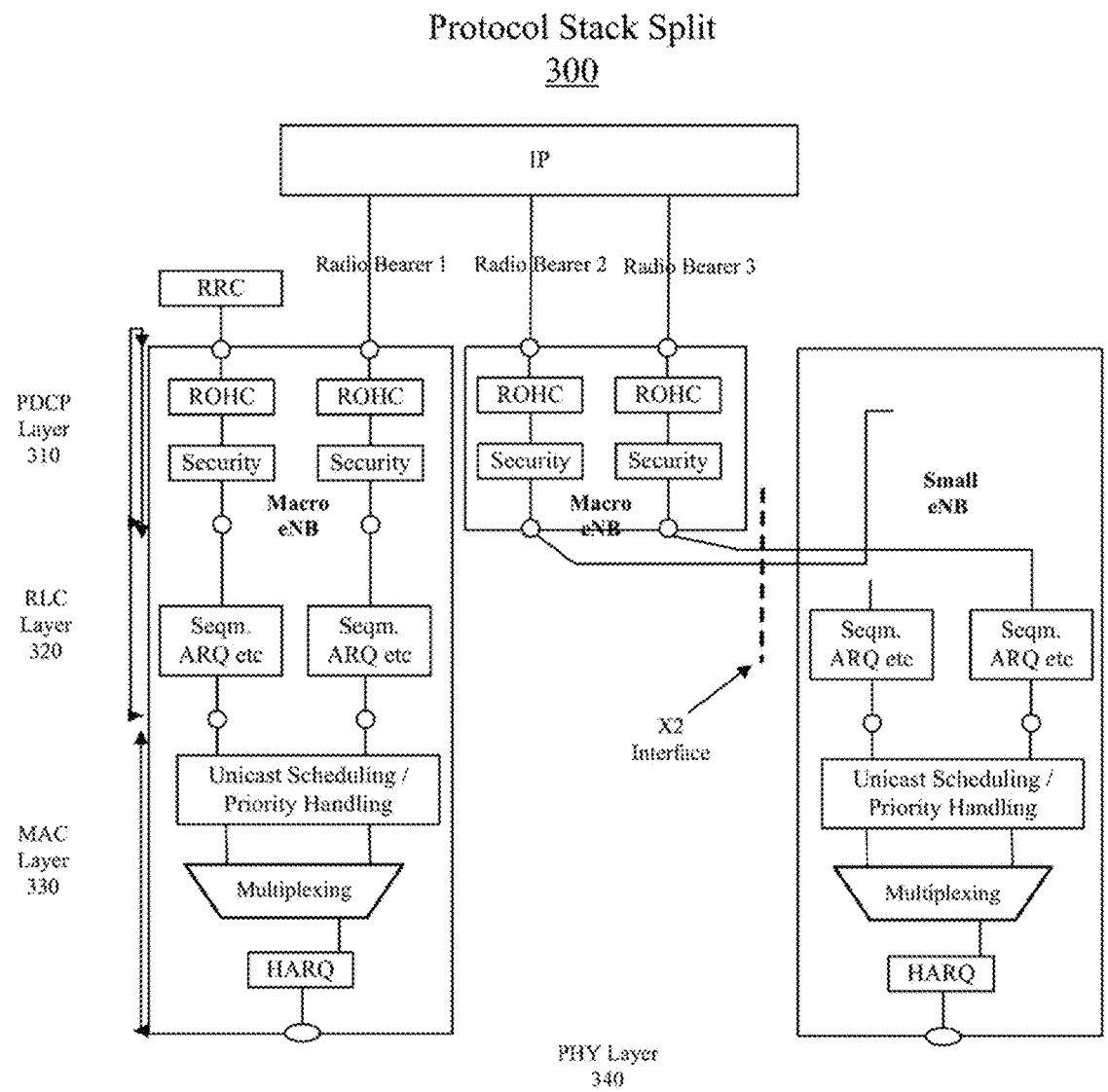
FIG. 3 illustrates an example first protocol stack split.

FIG. 3 illustrates an example first protocol stack split. In some examples, as shown in FIG. 3, the first protocol stack split includes protocol stack split 300. For these examples, the protocol stack may include PDCP layer 310, RLC layer 320, MAC layer 330 or PHY layer 340. According to some examples, internet protocol (IP) formatted packets for radio bearers 1-3 may be received at a macro cell eNB configured to serve as a primary cell to support a connection between an UE and an EPC. The small cell eNB may be configured to serve as a secondary cell. Radio bearers 1-3 may be separately characterized by parameters describing a type of information or data being transmitted over a radio interface that may have separate quality of service (QoS) requirements. For example, radio bearers 1-3 may include, but are not limited to, a voice over internet protocol (VoIP) radio bearer, a video streaming radio bearer or a best-effort file transfer radio bearer.

In some examples, as shown in FIG. 3, protocol stack processing may be split according to protocol stack split 300 such that the macro cell eNB may be capable of performing protocol stack processing on all three radio bearers for at least the PDCP layer 310 and perform protocol stack processing for 1 of 3 radio bearers for all four of the layers. The macro cell eNB may also be capable of performing protocol stack processing for radio resource control (RRC) packets for all four of the layers. Additionally, according to protocol stack split 300, the small cell eNB may perform protocol stack processing on three of the four layers for the other 2 radio bearers. As shown in FIG. 3, these three layers may include RLC layer 320, MAC layer 330 and PHY layer 340.

According to some examples, protocol stack processing for PDCP layer 310 may include, but is not limited to, robust header compression (ROHC) and security (deciphering) functions. Protocol stack processing for RLC layer 320 may include, but is not limited to, segmentation and automatic repeat request (ARQ) functions. Protocol stack processing for MAC layer 330 may include, but is not limited to unicast scheduling, priority handling of logical channels, multiplexing results of unicast scheduling and priority handling, or hybrid ARQ (HARM) functions. Protocol stack processing for PHY layer 340 may include, but is not limited to, functions for preparing processed packets for transmission via physical channels.

In some examples, as described more below, splitting protocol stack processing in a way similar to protocol stack split 300 may require the macro cell eNB to forward control information through a backhaul channel via an X2 interface. The control information may facilitate the small cell eNB's protocol stack processing on RLC layer 320, MAC layer 330 or PHY layer 340.

Figure 4:
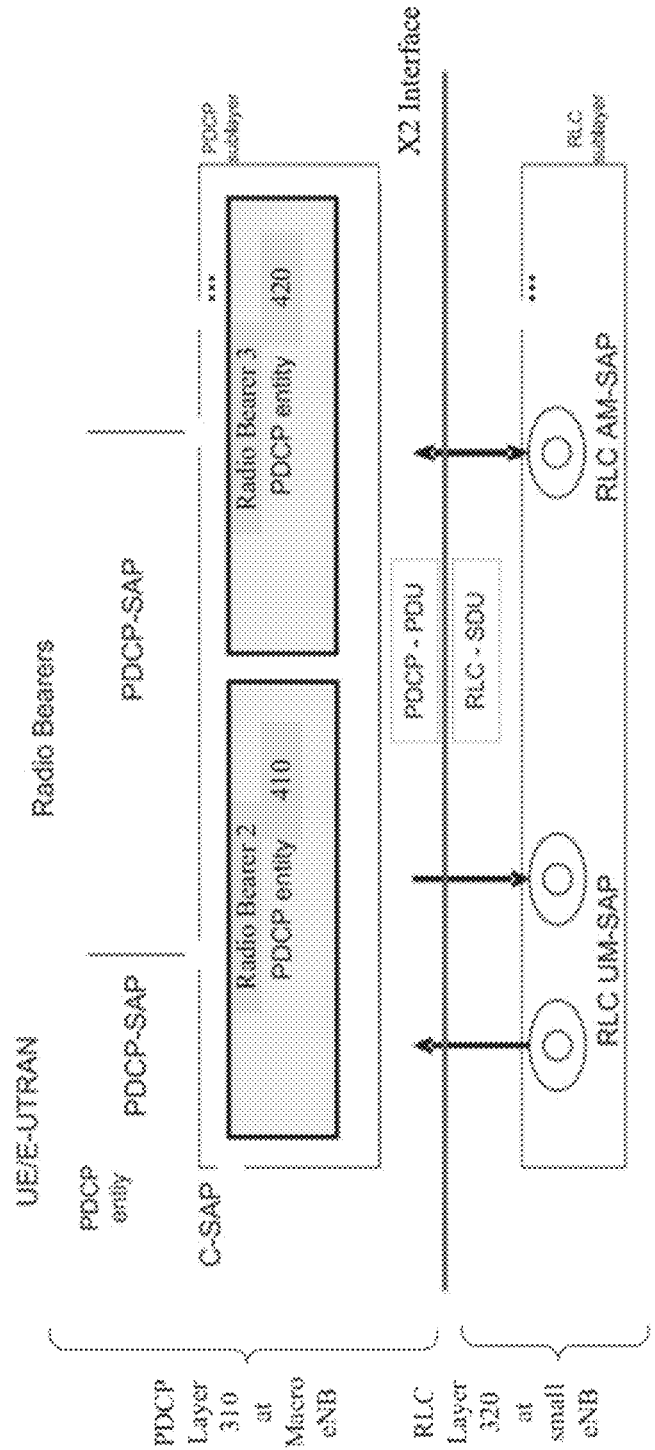
FIG. 4 illustrates an example first protocol stack split impact.

FIG. 4 illustrates an example first protocol stack split impact. In some examples, as shown in FIG. 4, the first protocol stack split impact includes protocol stack split impact 400. For these examples, protocol stack split impact 400 may be associated with protocol stack split 300 and depicts protocol stack processing for PDCP layer 310 at the macro cell eNB and protocol stack processing for RLC layer 320 at the small cell eNB. According to some examples, control information associated with PDCP PDUs may be forwarded via the X2 interface to facilitate protocol stack processing for RLC layer 320 and other layers at the small cell eNB.

According to some examples, service data units (SDUs) for at least some radio bearers may be received at RLC layer 320 in one of three modes, a transport mode (TM), an un-acknowledgment mode (UM) or an acknowledgement mode (AM). For example, as shown in FIG. 4, a PDCP entity 410 for radio bearer 2 may generate PDCP protocol data units (PDUs) that may be received at RLC layer 320 as UM SDUs by a UM service access point (UM-SAP). Also, as shown in FIG. 4, a PDCP entity 420 for radio bearer 3 may generate PDCP PDUs that may be received at RLC layer 320 as AM SDUs by an AM-SAP.

In some examples, protocol stack processing for lower layers at the small eNB such as MAC layer 330 may need some control information in order to make proper scheduling decisions. For these scheduling decisions, an amount of data available for transmission may be important. Since protocol stack processing for RLC layer 320 and MAC layer 330 are at the small eNB for radio bearers 2 and 3, according to protocol stack split 300, data available for transmission at PDCP layer 310 at the macro cell eNB may not be known at MAC layer 330. Therefore, control information may be transferred or forwarded by the macro cell eNB via the X2 interface that includes information to facilitate scheduling decisions associated with protocol stack processing for RLC layer 320 and/or MAC layer 330 at the small cell eNB.

According to some examples, control information may be forwarded by the macro cell eNB via the X2 interface through a backhaul link and received by the small cell eNB via its X2 interface. For these examples, the control information may be forwarded via the X2 interface at each transmission time interval (TTI). In alternate examples, the control information may be forwarded at other times rather than at each TTI. For these alternate examples, a threshold amount of control information may be needed before the control information is forwarded. That threshold amount may be associated with a memory buffer capacity at the macro cell eNB arranged to maintain the control information awaiting forwarding to the small cell eNB via the X2 interface. Exceeding the threshold amount may serve as an event-based trigger to forward the control information.

In some examples, the control information forwarded may include, but is not limited to, a number of PDCP control PDUs, a number of PDCP SDUs and number of PDCP PDUs not yet transferred to RLC layer 320. This can be per radio bearer or total sum for all radio bearers of the UE. Also, in some examples, as shown in FIG. 4 for radio bearer 3, PDCP PDUs generated by PDCP entity 420 may be received at RLC layer 320 as AM SDUs by the AM-SAP. For these examples, if PDCP entity 420 has implemented a re-establishment procedure during the given TTI, the control information forwarded may also include a number of PDCP SDUs not processed by PDCP entity 420 before the re-establishment procedure. Also, for these examples, a number of PDCP PDUs not yet transferred to RLC layer 320 and/or not acknowledged as successfully delivered to the AM-SAP by PDCP entity 420 may also be forwarded with the control information.

According to some example, control information may also be sent responsive to other types of event-based triggers. For example, control information may be sent when the number of PDCP PDUs not yet transferred to RLC layer 320 exceeds a threshold. This may avoid forwarding control information a TTI basis, and can especially be used in case on non-ideal X2 interface (i.e., when X2 interface delay is large). In some examples, other event-based triggers to forward control information can also be defined and examples are not limited to the event-based triggers mentioned above.

In some examples, control information may also be forwarded periodically, with a pre-defined static or dynamic period.

Figure 5:
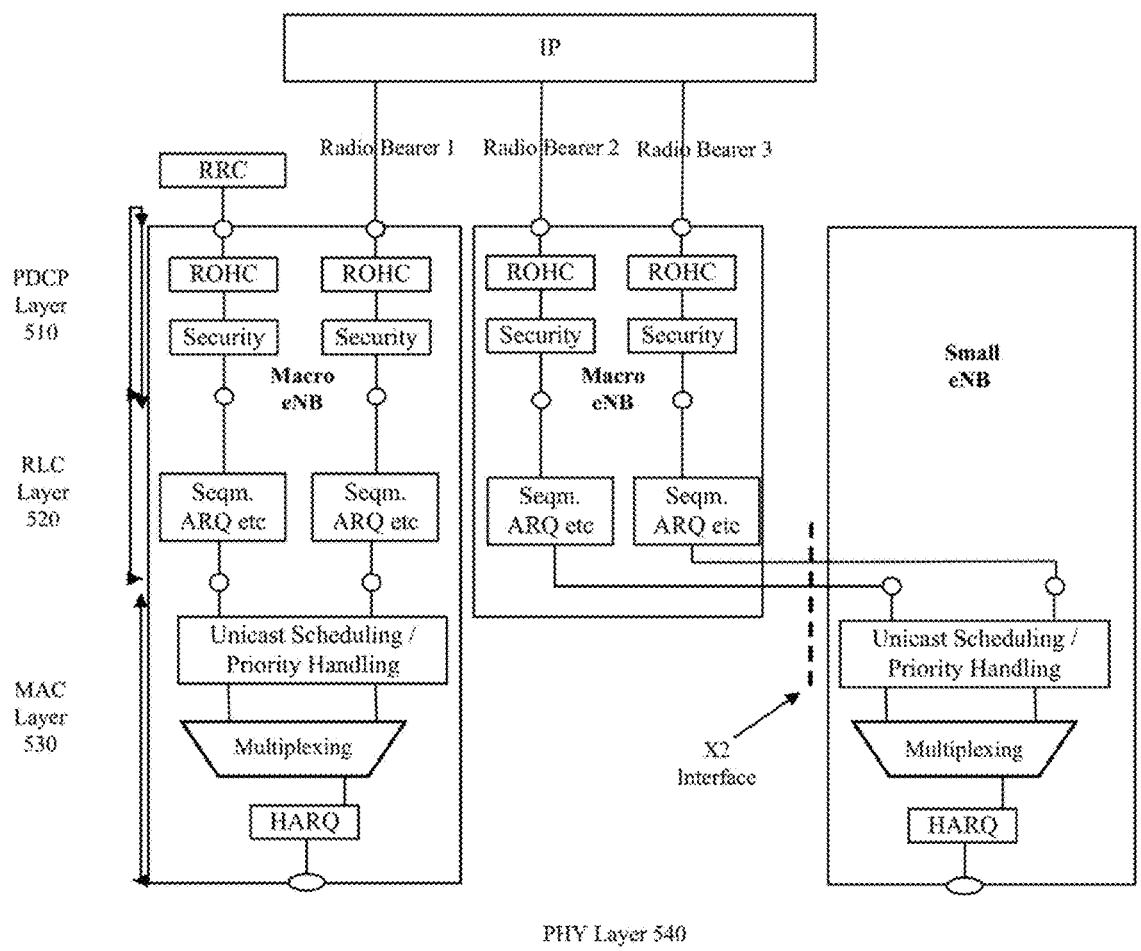
FIG. 5 illustrates an example second protocol stack split.

FIG. 5 illustrates an example second protocol stack split. In some examples, as shown in FIG. 5, the second protocol stack split includes protocol stack split 500. For these examples, the protocol stack may include PDCP layer 510, RLC layer 520, MAC layer 530 or PHY layer 540. According to some examples, similar to FIG. 3, IP formatted packets for radio bearers 1-3 may be received at a macro cell eNB configured to serve as a primary cell to support a connection between an UE and an EPC and the small cell eNB configured to serve as a secondary cell.

In some examples, as shown in FIG. 5, protocol stack processing may be split according to protocol stack split 500 such that the macro cell eNB may be capable of performing protocol stack processing on all three radio bearers for at least PDCP layer 510 and RLC layer 520 and perform protocol stack processing for 1 of 3 radio bearers for all four of the layers. The macro cell eNB may also be capable of performing protocol stack processing for RRC packets for all four of the layers. Additionally, according to protocol stack split 500, the small cell eNB may perform protocol stack processing on two of the four layers for the other 2 radio bearers. As shown in FIG. 5, these two layers may include MAC layer 530 and PHY layer 540.

According to some examples, as described more below, splitting protocol stack processing in a way similar to protocol stack split 500 may require the macro cell eNB to forward control information through a backhaul channel via an X2 interface. The control information may facilitate the small cell eNB's protocol stack processing on MAC layer 330 or PHY layer 340.

Figure 6:
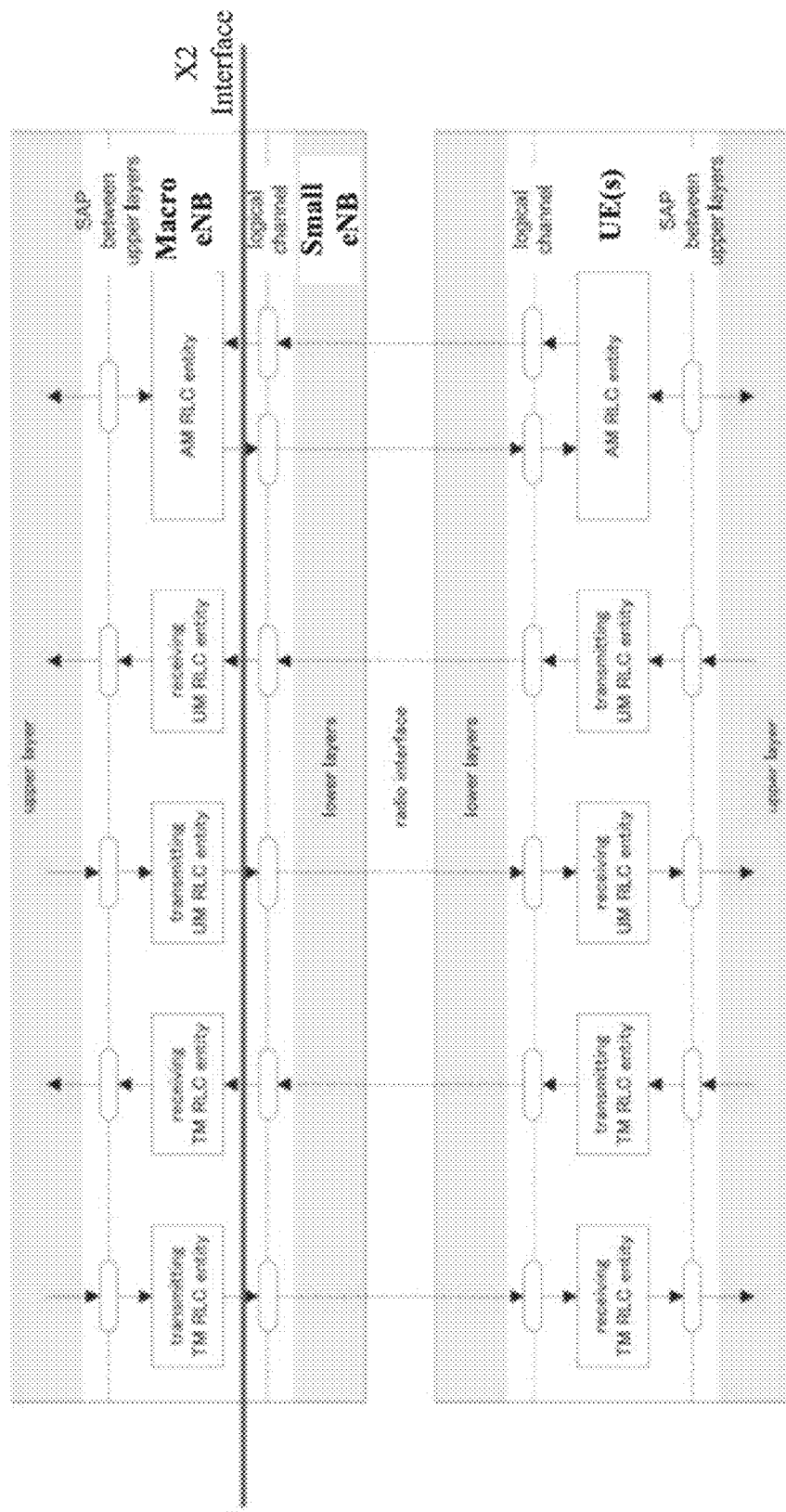
FIG. 6. illustrates an example second protocol stack split impact.

FIG. 6 illustrates an example second protocol stack split impact. In some examples, as shown in FIG. 6, the second protocol stack split impact includes protocol stack split impact 600. For these examples, protocol stack split impact 600 may be associated with protocol stack split 500 and depicts upper layer protocol stack processing for PDCP layer 510 and RLC layer 520 at the macro cell eNB and lower layer protocol stack processing for MAC layer 530 at the small cell eNB. According to some examples, control information needed for protocol stack processing for MAC layer 530 may be forwarded via the X2 interface to facilitate protocol stack processing at the small cell eNB.

According to some examples, the macro and small cell eNBs may be serving as primary/secondary cells for multiple UEs. For these examples, logical channel prioritization and scheduling functions at MAC layer 530 may be needed for not one UE but logical channel prioritization and scheduling functions are needed for each of the multiple UEs. As a result of having the need for logical prioritization and scheduling functions at MAC layer 530 for each of the multiple UEs, control information provided or forwarded by the macro cell eNB to the small cell eNB may be needed for protocol stack processing for both RLC layer 520 and MAC layer 530 at the small cell eNB.

In some examples, control information may be forwarded by the macro cell eNB via the X2 interface through a backhaul link and received by the small cell eNB via its X2 interface for radio bearers 2 and 3. For these examples, the control information may be forwarded via the X2 interface at each TTI. In alternate examples, as mentioned previously, control information may be forwarded at other times rather than at each TTI. For example, responsive to a threshold amount of control information in a memory buffer at the macro cell eNB awaiting forwarding to the small cell eNB via the X2 interface.

According to some examples, the control information may be forwarded at a given TTI and may include, but is not limited to, a number or size of RLC SDUs not yet transmitted at the macro cell eNB, an estimate of a number or size of status PDUs to be transmitted, a number of PDCP control PDUs a number of PDCP SDUs or a number of PDCP PDUs not yet transferred to RLC layer 520. This can be per radio bearer or total sum for all radio bearers of the UE.

In some examples, at least one of radio bearers 2 or 3 may be AM radio bearers. For these examples, the control information forwarded by the macro cell eNB may also include a number and size of RLC layer PDUs pending for retransmission. In other words, an acknowledgement has not been received at an RLC entity at the macro cell eNB for at least some RLC layer 520 PDUs sent to MAC layer 530 at the small cell eNB. The number and size of RLC layer PDUs pending for retransmission may be for un-acknowledged RLC PDUs that were not acknowledged within a given time interval.

According to some examples, similar to as mentioned above for FIG. 4, PDCP PDUs generated by a PDCP entity may be received at RLC layer 520 as AM SDUs by an AM-SAP. For these examples, if the PDCP entity has implemented a re-establishment procedure during the given TTI, the control information forwarded may also include a number of PDCP SDUs not processed by the PDCP entity before the re-establishment procedure. Also, for these examples, a number of PDCP PDUs not yet transferred to RLC layer 520 and/or not acknowledged as successfully delivered to the AM-SAP by the PDCP entity may also be forwarded with the control information.

As described before, in some examples, control information may also be forwarded responsive to an event-based trigger. For example, control information may be forwarded when the number of RLC PDUs at the macro cell eNB not yet transmitted exceeds a pre-defined threshold. Other event-based triggers to cause control information to be forwarded can be defined. Also, as described before, control information may be forwarded periodically, with a pre-defined static or dynamic period.

Figure 7:
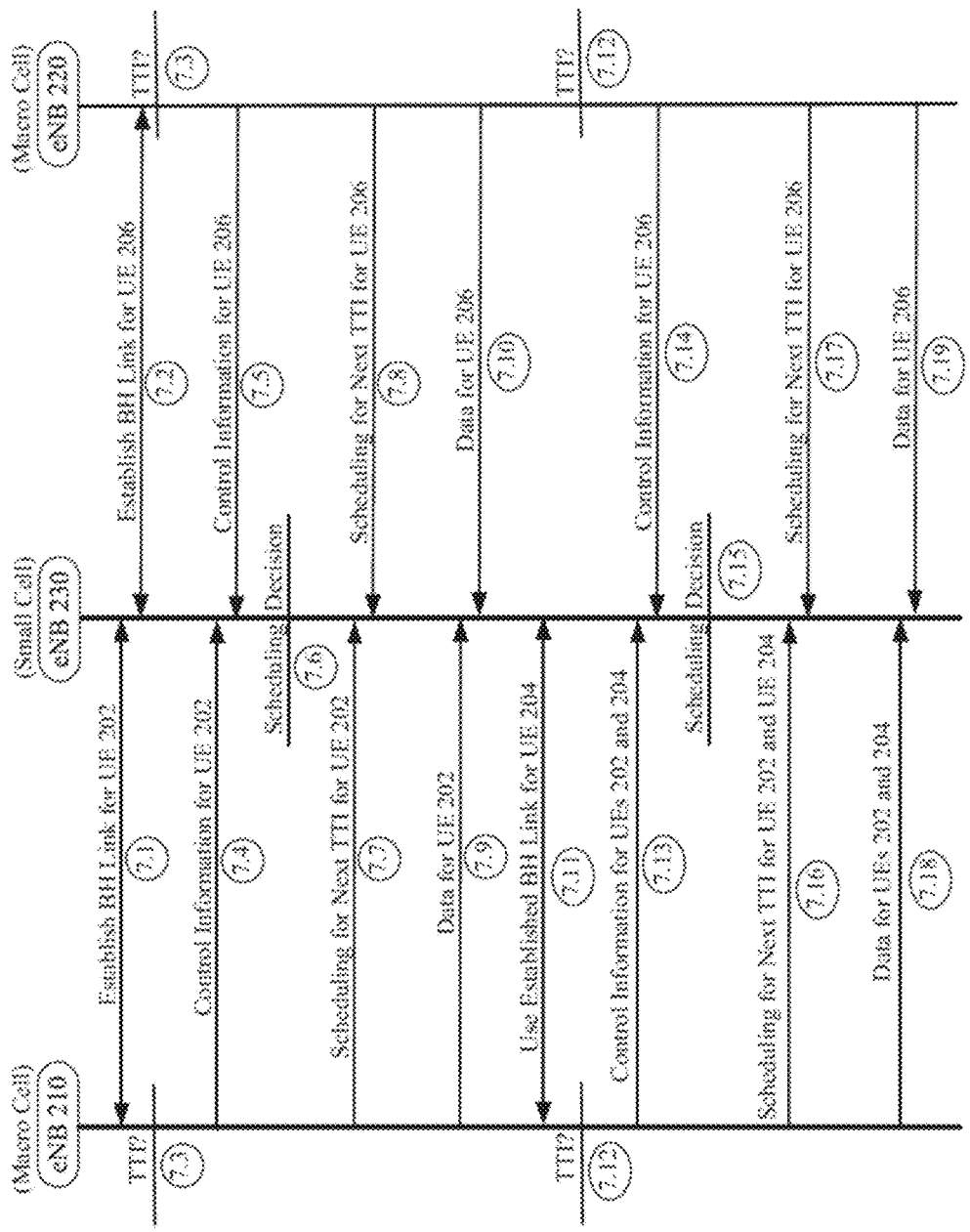
FIG. 7 illustrates an example process.

FIG. 7 illustrates an example process 700. In some examples, process 700 may illustrate techniques for facilitating dual connectivity for one or more UEs. For these examples, elements of system 200 as shown in FIG. 2 may be used for the processes shown in FIG. 7. Also, protocol stack splits 300 or 500 shown in FIGS. 3 and 5 may be implemented by elements of system 200 to facilitate the dual connectivity for the one or more UEs. However, the example process 700 is not limited to implementations using elements of system 200 in FIG. 2 or to stack splits 300 or 500 in FIGS. 3 and 5.

Beginning at process 7.1 (Establish BH Link for UE 202), logic and/or features at both macro cell eNB 210 and small cell eNB 230 may be capable of establishing BH link 235 between the two eNBs via an X2 interface. For these examples, BH link 235 may be established for small cell eNB 230 to serve as a secondary cell for UE 202 while macro cell eNB 210 serves as the primary cell for UE 202. In some examples, small cell eNB 230 and macro cell eNB 210 may implement either protocol stack split 300 or 500 as mentioned above for FIGS. 3 and 5 to split protocol stack processing for radio bearers associated with a connection between UE 202 and elements of an EPC. These elements of the EPC may include MME 240 or SGW 250.

Moving to process 7.2 (Establish BH Link for UE 206), logic and/or features at both macro cell eNB 210 and small cell eNB 220 may be capable of establishing BH link 225 between the two eNBs via the X2 interface maintained at small cell eNB 230 and an X2 interface maintained at macro cell eNB 210. For these examples, BH link 225 may be established for small cell eNB 230 to serve as a secondary cell for UE 206 while macro cell eNB 220 serves as the primary cell for UE 206. In some examples, small cell eNB 230 and macro cell eNB 210 may implement either protocol stack split 300 or 500 to split protocol stack processing for radio bearers associated with a connection between UE 206 and elements of an EPC.

Moving to process 7.3 (TTI?), logic and/or features at macro cell eNBs 210, 220 and small cell eNB 230 may be capable of determining whether a given transmission time interval or TTI has passed. In some examples, the given TTI may be defined and set at fixed time intervals. In other examples, other types of time intervals or periodic time periods may be substituted for or augment TTI. For example, a periodic time period that may be static and pre-defined or a periodic time period that may be dynamic. Also, an event-based trigger that may be based on a threshold amount of control information maintained in respective memory buffers at macro cell eNBs 210 and 220 may also serve a similar role as an expired TTI in that the event (threshold reached) may cause the control information to be forwarded.

Moving to process 7.4 (Control information for UE 202), logic and/or features at macro cell eNB 210 may be capable of forwarding control information for UE 202 to small cell eNB 230 through BH link 225 via an X2 interface maintained at macro cell eNB. Also, logic and/or features at small cell eNB 230 may be capable of receiving the control information for UE 202 via the X2 interface maintained at small cell eNB 230. In some examples, the control information for UE 202 may facilitate protocol stack processing on the split portion of protocol stack layers for at least a portion of radio bearers that was split according to protocol stack split 300 or 500.

Moving to process 7.5 (Control information for UE 206), logic and/or features at macro cell eNB 220 may be capable of forwarding control information for UE 206 to small cell eNB 230 through BH link 225 via the X2 interface maintained at macro cell eNB 220. Also, logic and/or features at small cell eNB 230 may be capable of receiving the control information for UE 206 via an X2 interface maintained at small cell eNB 230. In some examples, the control information for UE 206 may facilitate protocol stack processing on the split portion of protocol stack layers for at least a portion of radio bearers that was split according to protocol stack split 300 or 500.

Moving to process 7.6 (Scheduling decision), logic and/or features at small cell eNB 230 may be capable of making scheduling decisions based on the control information received for both UE 202 and 206.

Moving to process 7.7 (Scheduling for Next TTI for UE 202), logic and/or features at small cell eNB 230 may be capable of sending scheduling information for a next or subsequent TTI for UE 202 through BH link 235 via the X2 interface to macro cell eNB 210. In some examples, the scheduling for the next TTI for UE 202 may be based on scheduling decisions made at process 7.6. Those scheduling decisions may include prioritizing transmissions from macro cell eNB 210 that may be received for UE 202 at the next TTI.

Moving to process 7.8 (Scheduling for Next TTI for UE 206), logic and/or features at small cell eNB 230 may be capable of sending scheduling information for the next TTI for UE 206 through BH link 225 via the X2 interface to macro cell eNB 220. In some examples, the scheduling for the next TTI for UE 206 may be based on scheduling decisions made at process 7.6. Those scheduling decisions may include prioritizing transmissions from macro cell eNB 220 that may be received for UE 206 at the next TTI.

Moving to process 7.9 (Data for UE 202), logic and/or features at macro cell eNB 210 may be capable of forwarding data according to the scheduling information sent by small cell eNB 230 at process 7.7. Also, logic and/or features at small cell eNB 230 may be capable of receiving and processing data for UE 202 according to protocol stack split 300 or 500.

Moving to process 7.10 (Data for UE 206), logic and/or features at macro cell eNB 220 may be capable of forwarding data for UE 206 according to the scheduling information sent by small cell eNB 230 at process 7.8 Also, logic and/or features at small cell eNB 230 may be capable of receiving and processing the data for UE 206 according to protocol stack split 300 or 500.

Moving to process 7.11 (Use Established BH Link for UE 204), logic and/or features at both macro cell eNB 210 and small cell eNB 220 may be capable of using established BH link 225 for small cell eNB 230 to serve as a secondary cell for UE 204 while macro cell eNB 210 serves as the primary cell for UE 204. In some examples, small cell eNB 230 and macro cell eNB 210 may implement either protocol stack split 300 or 500 to split protocol stack processing for radio bearers associated with a second connection between UE 204 and elements of the EPC. For these examples, the second connection is separate from the connection between UE 202 and elements of the EPC mentioned above for process 7.1.

Moving to process 7.12 (TTI?), logic and/or features at macro cell eNBs 210, 220 and small cell eNB 230 may be capable of determining whether another given TTI has passed, period time period(s) passed and/or an event-based trigger such as a threshold amount of control information has been reached.

Moving to process 7.13 (Control Information for UEs 202 and 204), logic and/or features at macro cell eNB 210 may be capable of forwarding control information for both UEs 202 and 204 to small cell eNB 230 through BH link 225 via the X2 interface maintained at macro cell eNB. The control information for UE 202 may have been generated after the last TTI. Also, logic and/or features at small cell eNB 230 may be capable of receiving the control information for UEs 202 and 204 via its X2 interface.

Moving to process 7.14 (Control information for UE 206), logic and/or features at macro cell eNB 220 may be capable of forwarding additional control information for UE 206 through BH link 225 via the X2 interface maintain at macro cell eNB 220. The additional control information may have been generated after the last TTI. Also, logic and/or features at small cell eNB 230 may be capable of receiving the additional control information for UE 206 via its X2 interface.

Moving to process 7.15 (Scheduling decision), logic and/or features at small cell eNB 230 may be capable of making scheduling decision based on the control information received for UEs 202, 204 and 206.

Moving to process 7.16 (Scheduling for Next TTI for UEs 202 and 204), logic and/or features at small cell eNB 230 may be capable of sending scheduling information at yet another subsequent TTI for UEs 202 and 204 through BH link 235 via the X2 interface to macro cell eNB 210. In some examples, the scheduling for the other subsequent TTI for both UEs 202 and 204 may be based on scheduling decisions made at process 7.15. Those scheduling decisions may include prioritizing transmissions between UEs 202 and 204 from macro cell eNB 210 at the other subsequent TTI.

Moving to process 7.17 (Scheduling for Next TTI for UE 206), logic and/or features at small cell eNB 230 may be capable of sending scheduling information for the other subsequent TTI for UE 206 through BH link 225 via the X2 interface to macro cell eNB 220. In some examples, the scheduling for the next TTI for UE 206 may be based on scheduling decisions made at process 7.15. Those scheduling decisions may include prioritizing transmissions from macro cell eNB 220 that may be received for UE 206 at the other subsequent TTI.

Moving to process 7.18 (Data for UEs 202 and 204), logic and/or features at macro cell eNB 210 may be capable of forwarding data according to the scheduling information sent by small cell eNB 230 at process 7.16 for both UEs 202 and 204. Also, logic and/or features at small cell eNB 230 may be capable of receiving and processing data for UEs 202 and 204 according to protocol stack split 300 or 500.

Moving to process 7.19 (Data for UE 206), logic and/or features at macro cell eNB 220 may be capable of forwarding data for UE 206 according to the scheduling information sent by small cell eNB 230 at process 7.17. Also, logic and/or features at small cell eNB 230 may be capable of receiving and processing the data for UE 206 according to protocol stack split 300 or 500. Processes similar to processes 7.12 to 7.19 may repeat if eNBs 210, 220 and 230 continue to serve as primary or secondary cells for UEs 202, 204 or 206. Alternatively, process 700 may come to an end following respective connections between UEs 202, 204 or 206 with the elements of the EPC becoming terminated or UEs 202, 204, 206 moving outside macro or small cell areas provided by eNBs 210, 220 or 230.

Figure 8:
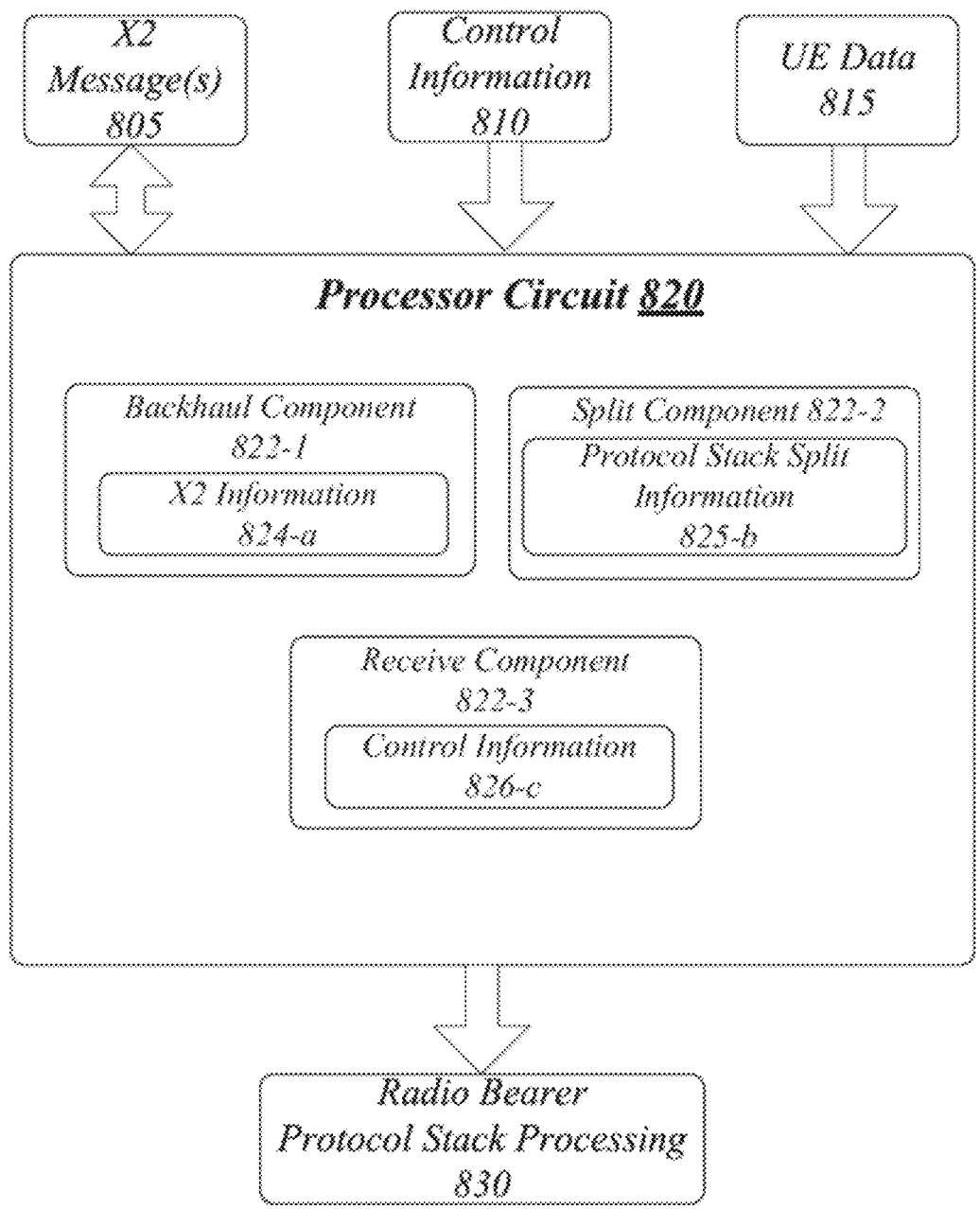
FIG. 8 illustrates an example block diagram for a first apparatus.

FIG. 8 illustrates a block diagram for an example first apparatus. As shown in FIG. 8, the example first apparatus includes apparatus 800. Although apparatus 800 shown in FIG. 8 has a limited number of elements in a certain topology, it may be appreciated that the apparatus 800 may include more or less elements in alternate topologies as desired for a given implementation.

The apparatus 800 may comprise a computer-implemented apparatus 800 having a processor circuit 820 arranged to execute one or more software components 822-a. It is worthy to note that "a" and "b" and "c" and similar designators as used herein are intended to be variables representing any positive integer. Thus, for example, if an implementation sets a value for a=3, then a complete set of software components 822-a may include components 822-1, 822-2 or 822-3. The examples are not limited in this context.

According to some examples, apparatus 800 may be implemented with system equipment such as network equipment for a communications system or network compliant with one or more 3GPP LTE Specifications. For example, apparatus 800 may be implemented as part of a base station or eNB for an LTE and/or LTE-A compliant wireless network that provides for a small cell coverage area (e.g., a small cell eNB). Although some examples are described with reference to a base station or eNB, examples may utilize any network equipment for a communications system or network. The examples are not limited in this context In some examples, as shown in FIG. 8, apparatus 800 includes processor circuit 820. Processor circuit 820 may be generally arranged to execute one or more software components 822-a. The processing circuit 820 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 820. According to some examples, processor circuit 820 may also be an application specific integrated circuit (ASIC) and at least some components 822-a may be implemented as hardware elements of the ASIC.

According to some examples, apparatus 800 may include a backhaul component 822-1. Backhaul component 822-1 may be executed by processor circuit 820 to establish a backhaul link with a macro cell eNB via an X2 interface. For these examples, the backhaul link may be established for the small cell eNB that may include or implement apparatus 800. The small cell eNB including apparatus 800 may serve as a secondary cell for an UE while the macro cell eNB serves as a primary cell. Backhaul component 822-1 may be capable of maintaining X2 information 824-a in a data structure such as a lookup table (LUT). X2 information 824-a may include protocol information associated with use of the X2 interface to exchange X2 message(s) 805 with the macro cell eNB to establish the backhaul link.

In some examples, apparatus 800 may also include a split component 822-2. Split component 822-2 may be executed by processor circuit 820 to split protocol stack processing with the macro cell eNB for radio bearers associated with a connection between the UE and an EPC such that the small cell eNB is to perform protocol stack processing on a portion of protocol stack layers excluding a PDCP layer. For these examples, split component 822-2 may be capable of maintaining protocol stack split information 825-b (e.g., in a LUT) that may indicate how the protocol stack processing is to be split. For example, the small cell eNB may perform protocol stack processing on an RLC layer, a MAC layer and a PHY layer in a manner similar to protocol stack split 300 for FIG. 3. Alternatively, small cell eNB may perform protocol stack processing on the MAC layer and the PHY layer in a manner similar to protocol stack split 500 for FIG. 5.

According to some examples, apparatus 800 may also include a receive component 822-3. Receive component 822-3 may be executed by processor circuit 820 to receive control information from the macro cell eNB through the backhaul link via the X2 interface to facilitate the protocol stack processing on the portion of protocol stack layers for a first portion of the radio bearers. For these examples, control information 810 may be received from the macro cell eNB and may include the control information to facilitate radio bearer protocol stack processing 830 for data that may be received at the small cell eNB and eventually transmitted to the UE. Receive component 822-3 may also be capable of at least temporarily storing at least some of the control information included in control information 810 with control information 826-c in a data structure such as a LUT.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 9 illustrates an example of a logic flow 900. Logic flow 900 may be representative of some or all of the operations executed by one or more logic, features, or devices described herein, such as apparatus 800 implemented in or at a small cell eNB. More particularly, logic flow 900 may be implemented by backhaul component 822-1, split component 822-2 or receive component 822-3.

In the illustrated example shown in FIG. 9, logic flow 900 at block 902 may establish, at a small cell eNB, a backhaul link with a macro cell eNB via an X2 interface, the backhaul link established for the small cell eNB to serve as a secondary cell for one or more UEs while the macro cell eNB serves as a primary cell for the one or more UEs. For these examples, backhaul component 822-1 may be capable of establishing the backhaul link with the macro cell eNB.

According to some examples, logic flow 900 at block 904 may split protocol stack processing between the small cell eNB and the macro cell eNB for radio bearers associated with a connection between an UE and an EPC such that the small cell eNB performs protocol stack processing on a portion of protocol stack layers excluding a PDCP layer. For these examples, split component 822-2 may cause the split in protocol stack processing between the small cell eNB and the macro cell eNB.

In some examples, logic flow 900 at block 906 may receive control information from the macro cell eNB through the backhaul link via the X2 interface to facilitate the protocol stack processing on the portion of protocol stack layers for a first portion of the radio bearers. For these examples, receive component 822-3 may receive the control information from the macro cell eNB.

FIG. 10 illustrates an embodiment of a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
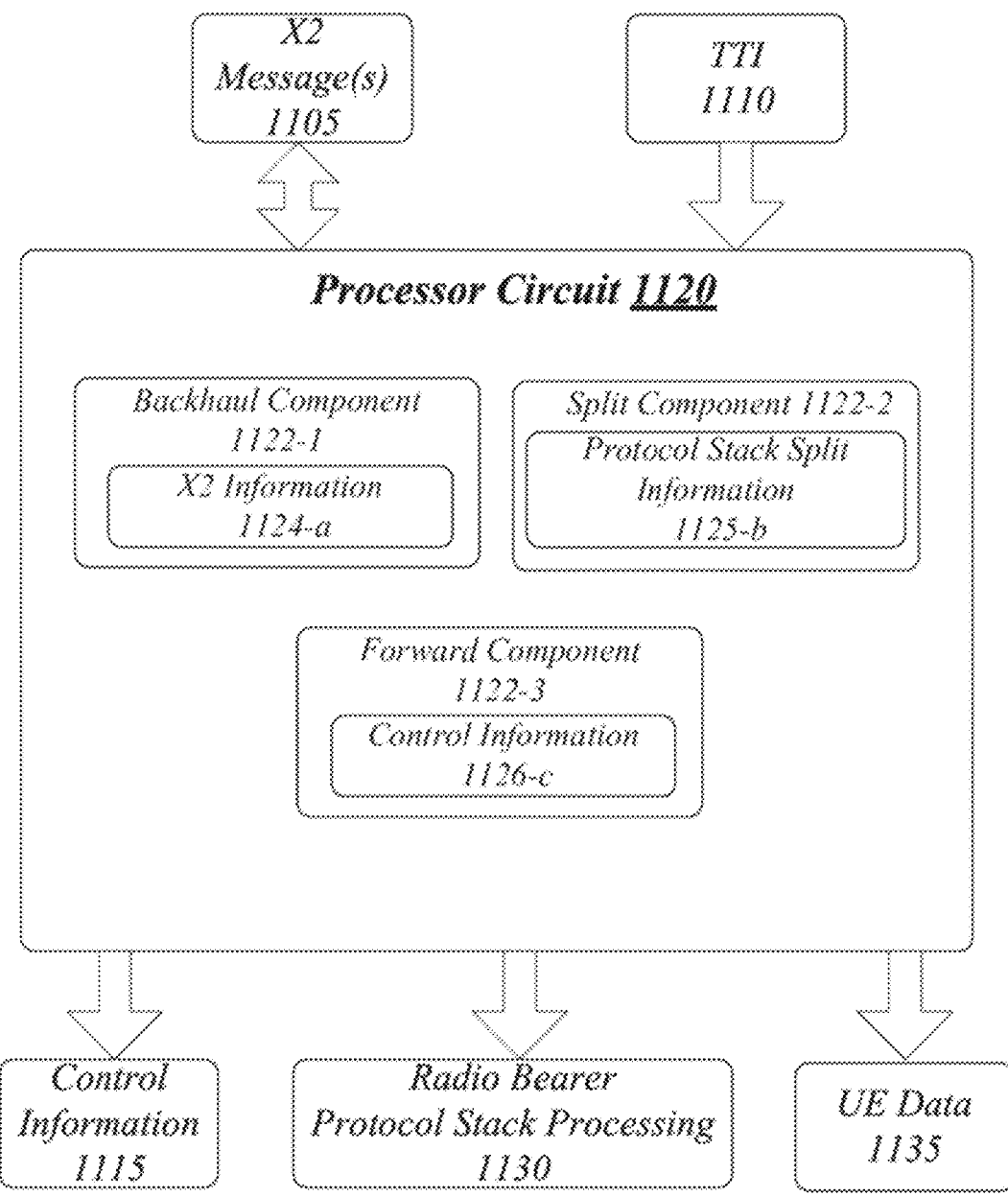
FIG. 11 illustrates an example block diagram for a second apparatus.

FIG. 11 illustrates a block diagram for an example second apparatus. As shown in FIG. 11, the example second apparatus includes apparatus 1100. Although apparatus 1100 shown in FIG. 11 has a limited number of elements in a certain topology, it may be appreciated that the apparatus 1100 may include more or less elements in alternate topologies as desired for a given implementation.

The apparatus 1100 may comprise a computer-implemented apparatus 1100 having a processor circuit 1120 arranged to execute one or more software components 1122-*a*. It is worthy to note that "a" and "b" and "c" and similar designators as used herein are intended to be variables representing any positive integer. Thus, for example, if an implementation sets a value for a=3, then a complete set of software components 1122-*a* may include components 1122-1, 1122-2 or 1122-3. The examples are not limited in this context.

According to some examples, apparatus 1100 may be implemented with system equipment such as network equipment for a communications system or network compliant with one or more 3GPP LTE Specifications. For example, apparatus 1100 may be implemented as part of a base station or eNB for an LTE and/or LTE-A compliant wireless network that provides for a macro cell coverage area (e.g., a macro cell eNB). Although some examples are described with reference to a base station or eNB, examples may utilize any network equipment for a communications system or network. The examples are not limited in this context In some examples, as shown in FIG. 11, apparatus 1100 includes processor circuit 1120. Processor circuit 1120 may be generally arranged to execute one or more software components 1122-*a*. The processing circuit 1120 can be any of various commercially available processors to included, but not limited to the processors mentioned above for apparatus 1100. Also, according to some examples, processor circuit 1120 may also be an ASIC and at least some components 1122-*a* may be implemented as hardware elements of the ASIC.

According to some examples, apparatus 1100 may include a backhaul component 1122-1. Backhaul component 1122-1 may be executed by processor circuit 1120 to establish a backhaul link with a small cell eNB via an X2 interface. For these examples, the backhaul link may be established for the macro cell eNB that may include or implement apparatus 1100. The macro cell eNB including apparatus 900 may serve as a primary cell for an UE while the small cell eNB serves as a secondary cell. Backhaul component 1122-1 may be capable of maintaining X2 information 1124-*a* in a data structure such as a lookup table (LUT). X2 information 1124-*a* may include protocol information associated with use of the X2 interface to exchange X2 message(s) 1105 with the small cell eNB to establish the backhaul link.

In some examples, apparatus 1100 may also include a split component 1122-3. Split component 1122-3 may be executed by processor circuit 1120 to split protocol stack processing with the small cell eNB for radio bearers associated with a connection between the UE and an EPC such that the macro cell eNB is to perform protocol stack processing on all protocol stack layers for a first portion of the radio bearers and is to perform protocol stack processing on a portion of protocol stack layers for a second portion of the radio bearers. The portion of protocol stack layers for the second portion of the radio bearers may include a PDCP layer. For these examples, split component 1122-2 may be capable of maintaining protocol stack split information 1125-*b* (e.g., in a LUT) that may indicate how the protocol stack processing is to be split. For example, the small cell eNB may perform protocol stack processing on an RLC layer, a MAC layer and a PHY layer in a manner similar to protocol stack split 300 for FIG. 3. Alternatively, small cell eNB may perform protocol stack processing on the MAC layer and the PHY layer in a manner similar to protocol stack split 500 for FIG. 5.

According to some examples, apparatus 1100 may also include a forward component 1122-3. Forward component 1122-3 may be executed by processor circuit 1120 to forward control information to the small cell eNB through the backhaul link via the X2 interface to facilitate the small cell eNB performing protocol stack processing on the portion of protocol stack layers for the second portion of radio bearers. For these examples, control information 1115 may be forwarded responsive to a given TTI indicated by TTI 1110 and may include the control information to facilitate radio bearer protocol stack processing 1130 for data included in UE data 1135 forwarded to the small cell eNB for eventually transmission to the UE. Forward component 1122-3 may also be capable of at least temporarily storing at least some of the control information included in control information 1115 with control information 1126-*c* in a data structure such as a LUT or a buffer maintained at apparatus 1100.

Various components of apparatus 1100 and a device implementing apparatus 1100 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 12 illustrates an example of a logic flow 1200. Logic flow 1200 may be representative of some or all of the operations executed by one or more logic, features, or devices described herein, such as apparatus 1100. More particularly, logic flow 1200 may be implemented by backhaul component 1122-1, split component 1122-2 or receive component 1122-3.

In the illustrated example shown in FIG. 12, logic flow 1200 at block 1202 may establish, at a macro cell eNB, a backhaul link with a small cell eNB via an X2 interface, the backhaul link established for the small cell eNB to serve as a secondary cell for an UE while the macro cell eNB serves as a primary cell for the UE. For these examples, backhaul component 1122-1 may be capable of establishing the backhaul link with the small cell eNB.

According to some examples, logic flow 1200 at block 1204 may split protocol stack processing between the macro cell eNB and the small cell eNB for radio bearers associated with a connection between the UE and an EPC such that the macro cell eNB performs protocol stack processing on all protocol stack layers for a first portion of the radio bearers and performs protocol stack processing on a portion of protocol stack layers for a second portion of the radio bearers, the portion of protocol stock layers may include a PDCP layer. For these examples, split component 1122-2 may cause the split in protocol stack processing between the macro cell eNB and the small cell eNB.

In some examples, logic flow 1200 at block 1206 may forward control information to the small cell eNB through the backhaul link via the X2 interface to facilitate the small cell eNB performing protocol stack processing on the portion of protocol stack layers for the second portion of the radio bearers. For these examples, forward component 1122-3 may forward the control information to the small cell eNB.

FIG. 13 illustrates an embodiment of a storage medium 1300. The storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
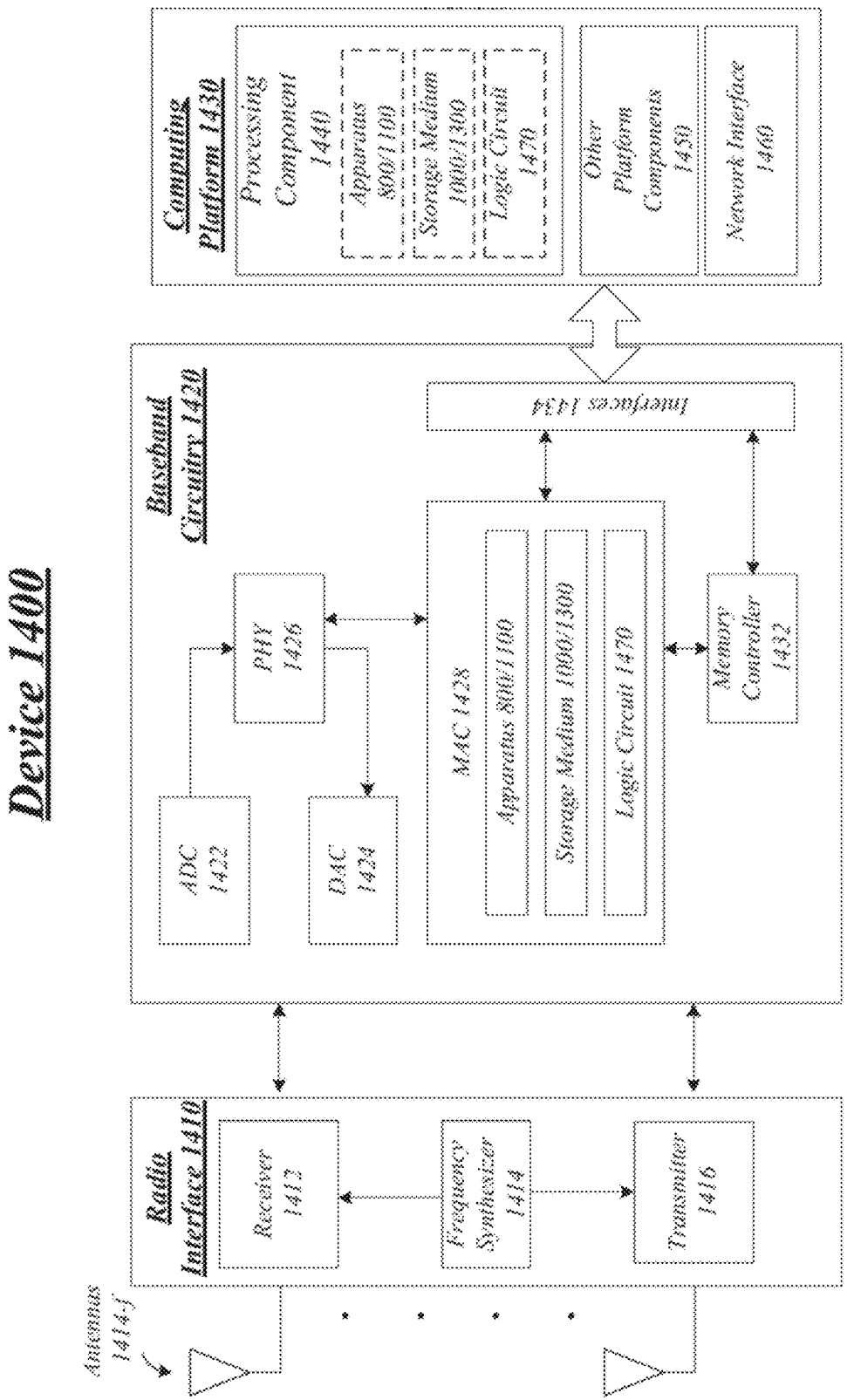
FIG. 14 illustrates an example of a device.

FIG. 14 illustrates an embodiment of a device 1400 for use in a broadband wireless access network. Device 1400 may implement, for example, apparatus 800/1100, storage medium 1000/1300 and/or a logic circuit 1470. The logic circuit 1470 may include physical circuits to perform operations described for apparatus 800 or apparatus 1100. As shown in FIG. 14, device 1400 may include a radio interface 1410, baseband circuitry 1420, and computing platform 1430, although examples are not limited to this configuration.

The device 1400 may implement some or all of the structure and/or operations for the apparatus 800/1100, storage medium 1000/1300 and/or logic circuit 1470 in a single computing entity, such as entirely within a single device. Alternatively, the device 1400 may distribute portions of the structure and/or operations for apparatus 800/1100, storage medium 1000/1300 and/or logic circuit 1470 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418-*f*. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with MAC processing circuit 1428 and/or a computing platform 1430, for example, via one or more interfaces 1434.

In some examples, PHY processing circuit 1426 may include a frame construction and/or detection module, in combination with additional circuitry such as a buffer memory, to construct and/or deconstruct communication frames (e.g., containing subframes). Alternatively or in addition, MAC processing circuit 1428 may share processing for certain of these functions or perform these processes independent of PHY processing circuit 1426. In some embodiments, MAC and PHY processing may be integrated into a single circuit.

Computing platform 1430 may provide computing functionality for device 1400. As shown, computing platform 1430 may include a processing component 1440. In addition to, or alternatively of, baseband circuitry 1420 of device 1400 may execute processing operations or logic for apparatus 800/1100, storage medium 1000/1300, and logic circuit 1470 using the processing component 1430. Processing component 1440 (and/or PHY 1426 and/or MAC 1428) may comprise various hardware elements, software elements, or a combination of both. Examples of hardware elements may include devices, logic devices, components, processors, microprocessors, circuits, processor circuits (e.g., processor circuit 620 or 920), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1430 may further include a network interface 1460. In some examples, network interface 1460 may include logic and/or features to support X2, S1-MME or S1-U interfaces as described in one or more 3GPP LTE or LTE-A specifications or standards. For these examples, network interface 1460 may enable an apparatus 800 or 1100 located at an eNB to communicatively couple through backhaul, control plane or user plane channels. In some other examples, network interface 1460 may include logic and/or features to support other communication interface described in the one or more 3GPP LTE or LTE-A specifications. For these examples, network interface 1460 may enable an apparatus 800 or 1100 located with an eNB to communicatively couple to one or more other eNBs or UEs via a wireless communications link.

Device 1400 may be, for example, user equipment, a computer, a personal computer (PC), a desktop computer, a laptop computer, an ultrabook computer, a smartphone, a tablet computer, a notebook computer, a netbook computer, a server, a server array or server farm, a web server, a network server, an Internet server, a work station, a minicomputer, a main frame computer, a supercomputer, a network appliance, a web appliance, a distributed computing system, multiprocessor systems, processor-based systems, wireless access point, base station, node B, evolved node B, subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired. In some embodiments, device 1400 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1400 may be implemented using single input single output (SISO) architectures. However, certain implementations may include multiple antennas (e.g., antennas 1418-*f*) for transmission and/or reception using adaptive antenna techniques for beamforming or spatial division multiple access (SDMA) and/or using multiple input multiple output (MIMO) communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit." It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 15:
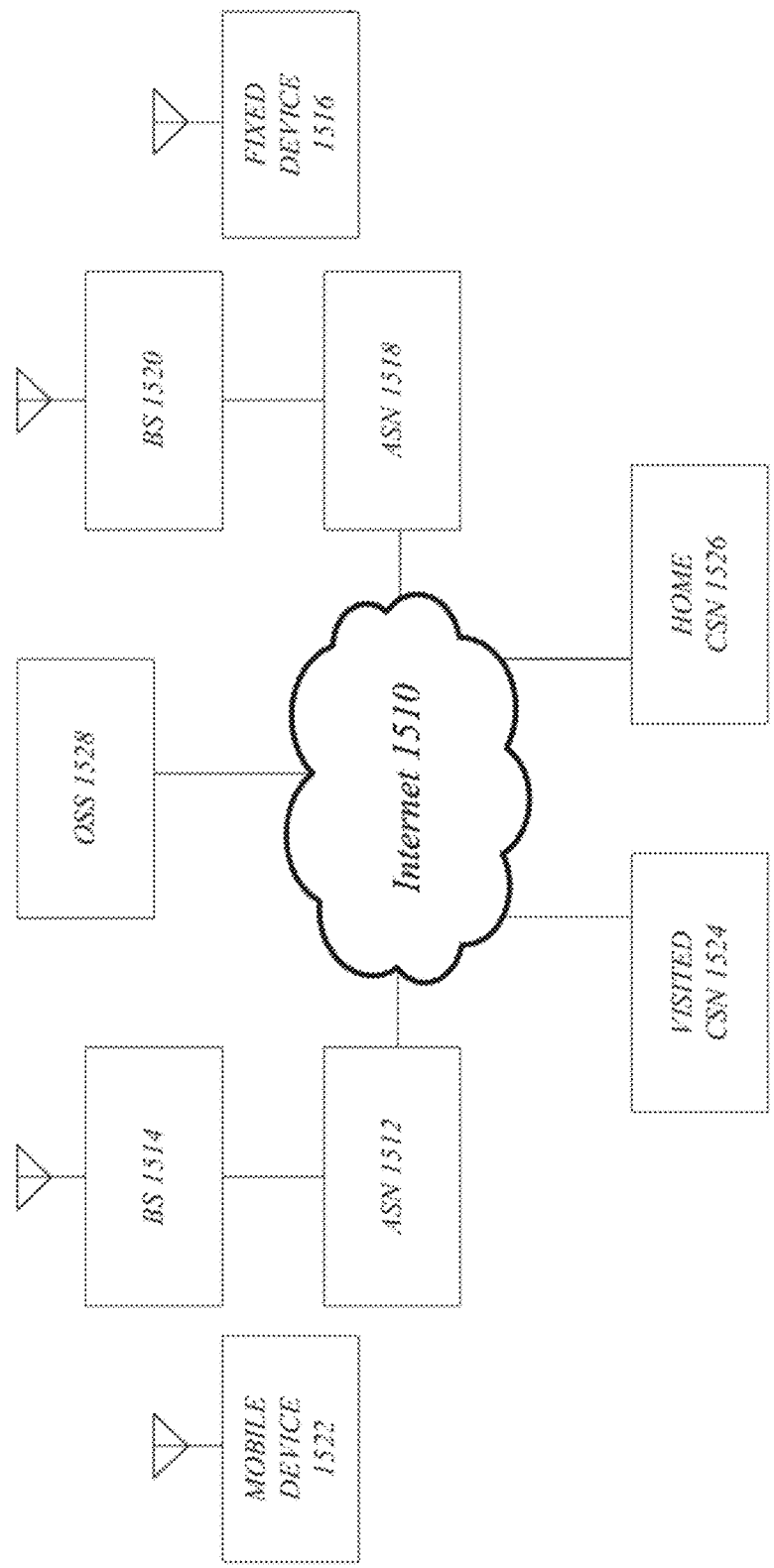
FIG. 15 illustrates an example of a broadband wireless access system.

FIG. 15 illustrates an embodiment of a broadband wireless access system 1500. As shown in FIG. 15, broadband wireless access system 1500 may be an internet protocol (IP) type network comprising an internet 1510 type network or the like that is capable of supporting mobile wireless access and/or fixed wireless access to internet 1510. In one or more embodiments, broadband wireless access system 1500 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1500, access service networks (ASN) 1514, 1518 are capable of coupling with base stations (BS) 1514, 1520 (RRHs or eNBs), respectively, to provide wireless communication between one or more fixed devices 1516 and internet 1510, or one or more mobile devices 1522 and Internet 1510. One example of a fixed device 1516 and a mobile device 1522 may be UE 102, with the fixed device 1316 comprising a stationary version of UE 102 and the mobile device 1322 comprising a mobile version of UE 102. ASN 1512 may implement profiles that are capable of defining the mapping of network functions to one or more physical entities on broadband wireless access system 1500. Base stations 1514, 1520 (or eNBs) may comprise radio equipment to provide RF communication with fixed device 1516 and mobile device 1522, such as described with reference to device 1500, and may comprise, for example, the PHY, MAC, RLC or PDCP layer equipment in compliance with a 3GPP LTE Specification or an IEEE 802.16 Standard. Base stations 1514, 1520 (or eNBs) may further comprise an IP backplane to couple to Internet 1510 via ASN 1512, 1518, respectively, although the scope of the claimed subject matter is not limited in these respects. Broadband wireless access system 1500 may further comprise a visited connectivity service network (CSN) 1524 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1524 or home CSN 1526, and the scope of the claimed subject matter is not limited in these respects. Visited CSN 1524 may be referred to as a visited CSN in the case where visited CSN 1524 is not part of the regular service provider of fixed device 1516 or mobile device 1522, for example where fixed 1516 or mobile device 1522 is roaming away from their respective home CSN 1526, or where broadband wireless access system 1500 is part of the regular service provider of fixed device 1516 or mobile device 1522 but where broadband wireless access system 1500 may be in another location or state that is not the main or home location of fixed device 1516 or mobile device 1522.

Fixed device 1516 may be located anywhere within range of one or both base stations 1514, 1520, such as in or near a home or business to provide home or business customer broadband access to Internet 1510 via base stations 1514, 1520 and ASN 1512, 1518, respectively, and home CSN 1526. It is worthy to note that although fixed device 1516 is generally disposed in a stationary location, it may be moved to different locations as needed. Mobile device 1522 may be utilized at one or more locations if mobile device 1522 is within range of one or both base stations 1514, 1520, for example.

In accordance with one or more embodiments, operation support system (OSS) 1528 may be part of broadband wireless access system 1500 to provide management functions for broadband wireless access system 1500 and to provide interfaces between functional entities of broadband wireless access system 1500. Broadband wireless access system 1500 of FIG. 15 is merely one type of wireless network showing a certain number of the components of broadband wireless access system 1500, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

In some examples, an example first apparatus may include a processor circuit for an eNB capable of operating in compliance with one or more 3GPP LTE standards including LTE-Advanced (LTE-A). The first apparatus also including a backhaul component for execution by the processor circuit to a backhaul component for execution by the processor circuit to establish a backhaul link with a macro cell eNB via an X2 interface. The backhaul link may be established for the small cell eNB to serve as a secondary cell for UE while the macro cell eNB serves as a primary cell for the UEs. The first apparatus also including a split component for execution by the processor circuit to split protocol stack processing with the macro cell eNB for radio bearers associated with a connection between the UE and an EPC such that the small cell eNB is to perform protocol stack processing on a portion of protocol stack layers excluding a PDCP layer. The first apparatus also including a receive component for execution by the processor circuit to receive control information from the macro cell eNB through the backhaul link via the X2 interface to facilitate the protocol stack processing on the portion of protocol stack layers for a first portion of the radio bearers.

In some examples for the first apparatus, the protocol stack layers may include the PDCP layer, a RLC layer, a MAC layer or a PHY layer.

According to some examples for the first apparatus, the split component may cause the small cell eNB to perform protocol stack processing on the RLC layer, the MAC layer and the PHY layer.

In some examples for the first apparatus, the control information may be received by the receive component from the macro cell eNB for the first portion of radio bearers for the UE. For these examples, the control information may include a number of PDCP control PDUs for the given TTI, a number of PDCP SDUs and a number of PDCP PDUs not yet transferred to the RLC layer.

According to some examples for the first apparatus, the first portion of radio bearers may include AM radio bearers.

For these examples, the PDCP layer protocol stack processing at the macro cell eNB may include implementing a re-establishment procedure during a given TTI. The control information may also include a number of PDCP SDUs not processed before the re-establishment procedure or a number of PDCP PDUs not yet transferred to the RLC layer or not acknowledged as successfully delivered.

In some examples for the first apparatus, the split component may cause the small cell eNB to perform protocol stack processing on the MAC layer and the PHY layer.

According to some examples for the first apparatus, the control information may be received by the receive component from the macro cell eNB for the first portion of radio bearers for the UE. For these examples, the control information may include a number or size of RLC SDUs not yet processed for the RLC layer at the macro cell eNB, an estimate of a number or size of status PDUs to be transmitted, a number of PDCP control PDUs, a number of PDCP SDUs or a number of PDCP PDUs not yet transferred to the RLC layer.

In some examples for the first apparatus, the first portion of radio bearers may include AM radio bearers. For these examples, the control information may also include a number and size of RLC layer PDUs pending for retransmission.

According to some examples for the first apparatus, the PDCP layer protocol stack processing at the macro cell eNB may include implementing a re-establishment procedure during a given TTI. For these examples, the control information may also include a number of PDCP SDUs not processed before the re-establishment procedure and a number of PDCP PDUs not yet transferred to the RLC layer or not acknowledged as successfully delivered.

In some examples for the first apparatus, the backhaul component may establish a second backhaul link with a second macro cell eNB via the X2 interface. For these examples, the second backhaul link may be established for the small cell eNB to serve as a secondary cell for a second UE while the second macro cell eNB serves as a primary cell for the second UE. Also for these examples, the split component may cause split protocol stack processing between the small cell eNB and the second macro cell eNB for second radio bearers associated with a second connection between a second UE and the EPC such that the small cell eNB is to perform protocol stack processing on the portion of protocol stack layers that excludes the PDCP layer. Also for these examples, the receive component may receive second control information from the second macro cell eNB through the second backhaul link via the X2 interface to facilitate the protocol stack processing on the portion of protocol stack layers for a first portion of the second radio bearers.

According to some examples for the first apparatus, the radio bearers associated with the connection between the UE and the EPC may include a VoIP radio bearer, a video streaming radio bearer or a best-effort file transfer radio bearer.

In some examples, the first apparatus may also include a digital display coupled to the processor circuit to present a user interface view.

In some examples, example first methods may include establishing, at a small cell eNB capable of operating in compliance with one or more 3GPP LTE standards including LTE-A, a backhaul link with a macro cell eNB via an X2 interface. The backhaul link may be established for the small cell eNB to serve as a secondary cell for one or more UEs while the macro cell eNB serves as a primary cell for the one or more UEs. The first methods may also include splitting protocol stack processing between the small cell eNB and the macro cell eNB for radio bearers associated with a connection between an UE and an EPC such that the small cell eNB performs protocol stack processing on a portion of protocol stack layers excluding a PDCP layer. The first methods may also include receiving control information from the macro cell eNB through the backhaul link via the X2 interface to facilitate the protocol stack processing on the portion of protocol stack layers for a first portion of the radio bearers.

According to some examples for the first methods, the protocol stack layers may include the PDCP layer, an RLC layer, a MAC layer and a PHY layer.

In some examples for the first methods, the small cell eNB may perform protocol stack processing on the RLC layer, the MAC layer and the PHY layer.

According to some examples for the first methods, the control information may be received from the macro cell eNB for the first portion of radio bearers for the UE. For these examples, the control information may include a number of PDCP control PDUs, a number of PDCP SDUs for the given TTI or a number of PDCP PDUs not yet transferred to the RLC layer.

In some examples for the first methods, the first portion of radio bearers may include AM radio bearers. For these examples, the PDCP layer protocol stack processing at the macro cell eNB may include implementing a re-establishment procedure during a given TTI. The control information may also include a number of PDCP SDUs not processed before the re-establishment procedure or a number of PDCP PDUs not yet transferred to the RLC layer or not acknowledged as successfully delivered.

According to some examples for the first methods, the small cell eNB performs protocol stack processing on the MAC layer and the PHY layer.

In to some examples for the first methods, the control information may be received from the macro cell eNB for the first portion of radio bearers for the UE. For these examples, the control information may include a number and size of RLC SDUs not yet processed for the RLC layer at the macro cell eNB, an estimate of a number and size of status PDUs to be transmitted, a number of PDCP control PDUs, a number of PDCP SDUs or a number of PDCP PDUs not yet transferred to the RLC layer.

According to some examples for the first methods, the first portion of radio bearers may include AM radio bearers. For these examples, the control information may also include a number and size of RLC layer PDUs pending for retransmission.

According to some examples for the first methods, the PDCP layer protocol stack processing at the macro cell eNB may include implementing a re-establishment procedure during a given TTI. For these examples, the control information may also include a number of PDCP SDUs not processed before the re-establishment procedure or a number of PDCP PDUs not yet transferred to the RLC layer or not acknowledged as successfully delivered.

In some examples, the first methods may also include splitting the protocol stack processing between the small cell eNB and the macro cell eNB for second radio bearers associated with a second connection between a second UE and the EPC such that the small cell eNB performs protocol stack processing on the portion of protocol stack layers excluding the PDCP layer. The first methods may also include receiving additional control information from the macro cell eNB through the backhaul link via the X2 interface to facilitate the protocol stack processing on the portion of protocol stack layers for the first portion of the second radio bearers. The first methods may also include scheduling transmissions to the UE and the second UE based on the control information and the additional control information received from the macro cell eNB.

According to some examples, the first methods may also include establishing, at the small cell eNB, a second backhaul link with a second macro cell eNB via the X2 interface. For these examples, the second backhaul link may be established for the small cell eNB to serve as a secondary cell for at least one UE while the second macro cell eNB serves as a primary cell for the at least one UE. The first methods may also include splitting protocol stack processing between the small cell eNB and the second macro cell eNB for second radio bearers associated with a second connection between a second UE and the EPC such that the small cell eNB performs protocol stack processing on the portion of protocol stack layers that excludes the PDCP layer. The first methods may also include receiving second control information from the second macro cell eNB through the second backhaul link via the X2 interface to facilitate the protocol stack processing on the portion of protocol stack layers for a first portion of the second radio bearers.

In some examples, a machine readable medium comprising a plurality of instructions that in response to being executed on a computing device may cause the computing device to carry out a computer-implemented method according to any one of the example first methods.

According some examples, an apparatus may include means for performing the computer-implemented methods of any one of the example first methods.

In some examples, an example first at least one machine readable medium may include a plurality of instructions that in response to being executed on a system for a small cell eNB capable of operating in compliance with one or more 3GPP LTE standards including LTE-A may cause the system to establish a backhaul link with a macro cell eNB via an X2 interface. The backhaul link may be established for the small cell eNB to serve as a secondary cell for UE while the macro cell eNB serves as a primary cell for the UE. The instructions may also cause the system to split protocol stack processing between the small cell eNB and the macro cell eNB for radio bearers associated with a connection between the UE and an EPC such that the small cell eNB is to perform protocol stack processing on a portion of protocol stack layers excluding a PDCP layer. The instructions may also cause the system to receive control information from the macro cell eNB through the backhaul link via the X2 interface to facilitate the protocol stack processing on the portion of protocol stack layers for the first portion of radio bearers.

According to some examples for the first at least one machine readable medium, the protocol stack layers may including the PDCP layer, a RLC layer, a MAC layer and a PHY layer.

In some examples for the first at least one machine readable medium, the small cell eNB may perform protocol stack processing on the RLC layer, the MAC layer and the PHY layer.

According to some examples for the first at least one machine readable medium, the control information may be received from the macro cell eNB for the first portion of radio bearers for the UE. For these examples, the control information may include a number of PDCP control PDUs, a number of PDCP SDUs or a number of PDCP PDUs not yet transferred to the RLC layer.

In some examples for the first at least one machine readable medium, the first portion of radio bearers may include AM radio bearers. For these examples, the PDCP layer protocol stack processing at the macro cell eNB may include implementing a re-establishment procedure during a given TTI. The control information may also include a number of PDCP SDUs not processed before the re-establishment procedure or a number of PDCP PDUs not yet transferred to the RLC layer or not acknowledged as successfully delivered.

According to some examples for the first at least one machine readable medium, the small cell eNB may perform protocol stack processing on the MAC layer and the PHY layer.

In some examples for the first at least one machine readable medium, the control information may be received from the macro cell eNB for the first portion of radio bearers for the UE. For these examples, the control information may include a number and size of RLC SDUs not yet processed for the RLC layer at the macro cell eNB, an estimate of a number and size of status PDUs to be transmitted, a number of PDCP control PDUs, a number of PDCP SDUs or a number of PDCP PDUs not yet transferred to the RLC layer.

According to some examples for the first at least one machine readable medium, the first portion of radio bearers may include AM radio bearers. For these examples, the control information may also include a number and size of RLC layer PDUs pending for retransmission.

In some examples for the first at least one machine readable medium, the PDCP layer protocol stack processing at the macro cell eNB may include implementing a re-establishment procedure during a given TTI. For these examples, the control information may also include a number of PDCP SDUs not processed before the re-establishment procedure or a number of PDCP PDUs not yet transferred to the RLC layer or not acknowledged as successfully delivered.

According to some examples for the first at least one machine readable medium, the instructions may also cause the system to establish a second backhaul link with a second macro cell eNB via the X2 interface, the second backhaul link established for the small cell eNB to serve as a secondary cell for a second UE while the second macro cell eNB serves as a primary cell for the second UE. The instructions may also cause the system to cause split protocol stack processing between the small cell eNB and the second macro cell eNB for second radio bearers associated with a second connection between a second UE and the EPC such that the small cell eNB is to perform protocol stack processing on the portion of protocol stack layers that excludes the PDCP layer. the instructions may also cause the system to receive second control information from the second macro cell eNB through the second backhaul link via the X2 interface to facilitate the protocol stack processing on the portion of protocol stack layers for a first portion of the second radio bearers.

In some examples for the first at least one machine readable medium, the radio bearers associated with the connection between the UE and the EPC may include a VoIP radio bearer, a video streaming radio bearer or a best-effort file transfer radio bearer.

In some examples, an example second apparatus may include a processor circuit for a macro cell eNB capable of operating in compliance with one or more 3GPP LTE standards including LTE-A. The second apparatus also including a backhaul component for execution by the processor circuit to establish a backhaul link with a small cell eNB via an X2 interface. The backhaul link may be established for the small cell eNB to serve as a secondary cell for UE while the macro cell eNB serves as a primary cell for the UE. The second apparatus may also include a split component for execution by the processor circuit to split protocol stack processing with the small cell eNB for radio bearers associated with a connection between the UE and an EPC such that the macro cell eNB is to perform protocol stack processing on all protocol stack layers for a first portion of the radio bearers and is to perform protocol stack processing on a portion of protocol stack layers for a second portion of the radio bearers, the portion of protocol stack layers including a PDCP layer. The second apparatus may also include a forward component for execution by the processor circuit to forward control information to the small cell eNB through the backhaul link via the X2 interface to facilitate the small cell eNB performing protocol stack processing on the portion of protocol stack layers for the second portion of radio bearers.

In some examples for the second apparatus, the protocol stack layers may include the PDCP layer, a RLC layer, a MAC layer and a PHY layer.

According to some examples for the second apparatus, the split component may cause the macro cell eNB to perform protocol stack processing on only the PDCP layer for the second portion of radio bearers.

In some examples for the second apparatus, the control information may be forwarded by the forward component to the small cell eNB for the second portion of radio bearers responsive to at least one of a given TTI, a periodic time period that is static and pre-defined, a periodic time period that is dynamic or an event-based trigger. For these examples, the control information may include a number of PDCP control PDUs, a number of PDCP SDUs or a number of PDCP PDUs not yet transferred to the RLC layer to be processed at the small cell eNB.

According to some examples for the second apparatus, the second portion of radio bearers may include AM radio bearers. For these examples, the PDCP layer protocol stack processing at the macro cell eNB may include implementing a re-establishment procedure during the given TTI, the control information also including a number of PDCP SDUs not processed before the re-establishment procedure or a number of PDCP PDUs not yet transferred to the RLC layer to be processed at the small cell eNB or not acknowledged as successfully delivered to the RLC layer.

In some examples for the second apparatus, the split component may cause the macro cell eNB to perform protocol stack processing on both the PDCP layer and the RLC layer.

According to some examples for the second apparatus, the control information may be forwarded by the forward component to the small cell eNB for the second portion of radio bearers responsive to at least one of a given TTI, a periodic time period that is static and pre-defined, a periodic time period that is dynamic or an event-based trigger. For these examples, the control information may include a number and size of RLC SDUs not yet processed for the RLC layer at the macro cell eNB, an estimate of a number and size of status PDUs to be transmitted, a number of PDCP control PDUs, a number of PDCP SDUs or a number of PDCP PDUs not yet transferred to the RLC layer.

In some examples for the second apparatus, the second portion of radio bearers including AM radio bearers. For these examples, the control information may also include a number and size of RLC layer PDUs pending for retransmission.

According to some examples for the second apparatus, the PDCP layer protocol stack processing at the macro cell eNB may include implementing a re-establishment procedure during the given TTI. For these examples, the control information may also include a number of PDCP SDUs not processed before the re-establishment procedure or a number of PDCP PDUs not yet transferred to the RLC layer or not acknowledged as successfully delivered.

In some examples for the second apparatus, the radio bearers associated with the connection between the UE and the EPC may include a VoIP radio bearer, a video streaming radio bearer or a best-effort file transfer radio bearer.

In some examples, the second apparatus may also include a digital display coupled to the processor circuit to present a user interface view.

In some examples, example second methods may include establishing, at a macro cell eNB capable of operating in compliance with one or more 3GPP LTE standards including LTE-A, small cell eNB, a backhaul link with a small cell eNB via an X2 interface. The backhaul link may be established for the small cell eNB to serve as a secondary cell for user equipment (UE) while the macro cell eNB serves as a primary cell for the UE. The second methods may also include splitting protocol stack processing between the macro cell eNB and the small cell eNB for radio bearers associated with a connection between the UE and an EPC such that the macro cell eNB performs protocol stack processing on all protocol stack layers for a first portion of the radio bearers and performs protocol stack processing on a portion of protocol stack layers for a second portion of the radio bearers, the portion of protocol stack layers including a PDCP layer. The second methods may also include forwarding control information to the small cell eNB through the backhaul link via the X2 interface to facilitate the small cell eNB performing protocol stack processing on the portion of protocol stack layers for the second portion of radio bearers.

According to some examples for the second methods, the protocol stack layers may include the PDCP layer, an RLC layer, a MAC layer and a PHY layer.

In some examples for the second methods, the macro cell eNB may perform protocol stack processing on only the PDCP layer for the second portion of radio bearers.

According to some examples for the second methods, the control information may be forwarded to the small cell eNB for the second portion of radio bearers responsive to at least one of a given TTI, a periodic time period that is static and pre-defined, a periodic time period that is dynamic or an event-based trigger. For these examples, the control information may include a number of PDCP PDUs, a number of PDCP SDUs or a number of PDCP PDUs not yet transferred to the RLC layer to be processed at the small cell eNB.

In some examples for the second methods, the second portion of radio bearers may include AM radio bearers. For these examples, the PDCP layer protocol stack processing at the macro cell eNB may include implementing a re-establishment procedure during the given TTI. The control information may also include a number of PDCP SDUs not processed before the re-establishment procedure or a number of PDCP PDUs not yet transferred to the RLC layer to be processed at the small cell eNB or not acknowledged as successfully delivered to the RLC layer.

According to some examples for the second methods, the macro cell eNB may perform protocol stack processing on both the PDCP layer and the RLC layer.

In some examples for the second methods, the control information may be forwarded to the small cell eNB for the second portion of radio bearers responsive to at least one of a given TTI, a periodic time period that is static and pre-defined, a periodic time period that is dynamic or an event-based trigger. For these examples, the control information may include a number and size of RLC SDUs not yet processed by the RLC layer at the macro cell eNB, an estimate of a number and size of status PDUs to be transmitted, a number of PDCP control PDUs, a number of PDCP SDUs or a number of PDCP PDUs not yet transferred to the RLC layer.

According to some examples for the second methods, the second portion of radio bearers may include AM radio bearers. For these examples, the control information may also include a number and size of RLC layer PDUs pending for retransmission.

In some examples for the second methods, the PDCP layer protocol stack processing at the macro cell eNB may include implementing a re-establishment procedure during the given TTI. For these examples, the control information may also include a number of PDCP SDUs not processed before the re-establishment procedure or a number of PDCP PDUs not yet transferred to the RLC layer or not acknowledged as successfully delivered.

According to some examples for the second methods, the radio bearers associated with the connection between the UE and the EPC may include a VoIP radio bearer, a video streaming radio bearer or a best-effort file transfer radio bearer.

In some examples, a machine readable medium comprising a plurality of instructions that in response to being executed on a computing device may cause the computing device to carry out a computer-implemented method according to any one of the example second methods.

According some examples, an apparatus may include means for performing the computer-implemented methods of any one of the example second methods.

In some examples, an example second at least one machine readable medium may include a plurality of instructions that in response to being executed on a system for a macro cell eNB capable of operating in compliance with one or more 3GPP LTE standards including LTE-A may cause the system to split protocol stack processing between the macro cell eNB and the small cell eNB for radio bearers associated with a connection between an UE and an EPC such that the macro cell eNB performs protocol stack processing on all protocol stack layers for a first portion of the radio bearers and performs protocol stack processing on a portion of protocol stack layers for a second portion of the radio bearers, the portion of protocol stack layers including a PDCP layer. The instructions may also cause the system to forward control information to the small cell eNB through the backhaul link via the X2 interface to facilitate the small cell eNB performing protocol stack processing on the portion of protocol stack layers for the second portion of radio bearers.

According to some examples for the second at least one machine readable medium, the protocol stack layers including the PDCP layer, a RLC layer, a MAC layer and a PHY layer.

In some examples for the second at least one machine readable medium, the macro cell eNB may perform protocol stack processing on only the PDCP layer for the second portion of radio bearers.

According to some examples for the second at least one machine readable medium, the control information may be forwarded to the small cell eNB for the second portion of radio bearers responsive to at least one of a given TTI, a periodic time period that is static and pre-defined, a periodic time period that is dynamic or an event-based trigger. For these examples, the control information may include a number of PDCP control PDUs, a number of PDCP SDUs or a number of PDCP PDUs not yet transferred to the RLC layer to be processed at the small cell eNB.

In some examples for the second at least one machine readable medium, the second portion of radio bearers may include AM radio bearers. For these examples, the PDCP layer protocol stack processing at the macro cell eNB including implementing a re-establishment procedure during the given TTI. The control information may also include a number of PDCP SDUs not processed before the re-establishment procedure or a number of PDCP PDUs not yet transferred to the RLC layer to be processed at the small cell eNB or not acknowledged as successfully delivered to the RLC layer.

According to some examples for the second at least one machine readable medium, the macro cell eNB may perform protocol stack processing on both the PDCP layer and the RLC layer.

In some examples for the second at least one machine readable medium, the control information may be forwarded to the small cell eNB for the second portion of radio bearers responsive to at least one of a given TTI, a periodic time period that is static and pre-defined, a periodic time period that is dynamic or an event-based trigger. For these examples, the control information may include a number and size of RLC SDUs not yet processed by the RLC layer at the macro cell eNB, an estimate of a number and size of status PDUs to be transmitted, a number of PDCP control PDUs, a number of PDCP SDUs or a number of PDCP PDUs not yet transferred to the RLC layer.

According to some examples for the second at least one machine readable medium, the second portion of radio bearers may include AM radio bearers. For these examples, the control information may also include a number and size of RLC layer PDUs pending for retransmission.

In some examples for the second at least one machine readable medium, the PDCP layer protocol stack processing at the macro cell eNB may include implementing a re-establishment procedure during the given TTI, the control information also including a number of PDCP SDUs not processed before the re-establishment procedure or a number of PDCP PDUs not yet transferred to the RLC layer or not acknowledged as successfully delivered.

According to some examples for the second at least one machine readable medium, the radio bearers associated with the connection between the UE and the EPC may include a VoIP radio bearer, a video streaming radio bearer or a best-effort file transfer radio bearer.

In some examples for the second at least one machine readable medium, the instructions may further cause the system to split the protocol stack processing between the macro cell eNB and the small cell eNB for second radio bearers associated with a second connection between a second UE and the EPC such that the macro cell eNB performs protocol stack processing on all protocol stack layers for a first portion of the second radio bearers and performs protocol stack processing on a portion of protocol stack layers for a second portion of the second radio bearers, the portion of protocol stack layers including the PDCP layer. The instructions may also cause the system to forward additional control information to the small cell eNB through the backhaul link via the X2 interface to facilitate protocol stack processing by the small cell eNB on the portion of protocol stack layers for the first portion of the second radio bearers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
a processor circuit for a small cell evolved Node B (eNB) capable of operating in compliance with one or more 3rd Generation Partnership Project (3GPP) Long Term Evolution (LTE) standards including LTE-Advanced (LTE-A);
a backhaul component for execution by the processor circuit to establish a backhaul link with a macro cell eNB via an X2 interface, the backhaul link established for the small cell eNB to serve as a secondary cell for user equipment (UE) while the macro cell eNB serves as a primary cell for the UEs;
a split component for execution by the processor circuit to split protocol stack processing with the macro cell eNB for radio bearers associated with a connection between the UE and an evolved packet core (EPC) such that the small cell eNB is to perform protocol stack processing on a portion of protocol stack layers excluding a protocol data convergence protocol (PDCP) layer; and
a receive component for execution by the processor circuit to receive control information from the macro cell eNB through the backhaul link via the X2 interface to facilitate the protocol stack processing on the portion of protocol stack layers for a first portion of the radio bearers, the control information including a number of PDCP service data units (SDUs) not processed before a re-establishment procedure implemented at the macro cell eNB during a given transmission time interval (TTI).

2. The apparatus of claim 1, comprising the protocol stack layers including the PDCP layer, a radio link control (RLC) layer, a media access control (MAC) layer or a physical (PHY) layer.

3. The apparatus of claim 2, comprising the split component to cause the small cell eNB to perform protocol stack processing on the RLC layer, the MAC layer and the PHY layer.

4. The apparatus of claim 3, comprising the control information received by the receive component from the macro cell eNB for the first portion of radio bearers for the UE, the control information including a number of PDCP control protocol data units (PDUs) and a number of PDCP PDUs not yet transferred to the RLC layer.

5. The apparatus of claim 4, comprising the first portion of radio bearers including acknowledgement mode (AM) radio bearers, the PDCP layer protocol stack processing at the macro cell eNB including implementing the re-establishment procedure during the given TTI, the control information also including a number of PDCP PDUs not yet transferred to the RLC layer or not acknowledged as successfully delivered.

6. The apparatus of claim 2, comprising the split component to cause the small cell eNB to perform protocol stack processing on the MAC layer and the PHY layer.

7. The apparatus of claim 6, comprising the control information received by the receive component from the macro cell eNB for the first portion of radio bearers for the UE, the control information including a number or size of RLC SDUs not yet processed for the RLC layer at the macro cell eNB, an estimate of a number or size of status protocol data units (PDUs) to be transmitted, a number of PDCP control PDUs, a number of PDCP SDUs or a number of PDCP PDUs not yet transferred to the RLC layer.

8. The apparatus of claim 7, comprising the first portion of radio bearers including acknowledgement mode (AM) radio bearers, the control information also including a number and size of RLC layer PDUs pending for retransmission.

9. The apparatus of claim 8, comprising the PDCP layer protocol stack processing at the macro cell eNB including implementing the re-establishment procedure during the given TTI, the control information also including a number of PDCP PDUs not yet transferred to the RLC layer or not acknowledged as successfully delivered.

10. The apparatus of claim 1, comprising:
the backhaul component to establish a second backhaul link with a second macro cell eNB via the X2 interface, the second backhaul link established for the small cell eNB to serve as a secondary cell for a second UE while the second macro cell eNB serves as a primary cell for the second UE;
the split component to cause split protocol stack processing between the small cell eNB and the second macro cell eNB for second radio bearers associated with a second connection between a second UE and the EPC such that the small cell eNB is to perform protocol stack processing on the portion of protocol stack layers that excludes the PDCP layer; and
the receive component to receive second control information from the second macro cell eNB through the second backhaul link via the X2 interface to facilitate the protocol stack processing on the portion of protocol stack layers for a first portion of the second radio bearers.

11. The apparatus of claim 1, comprising the radio bearers associated with the connection between the UE and the EPC include a voice over internet protocol (VoIP) radio bearer, a video streaming radio bearer or a best-effort file transfer radio bearer.

12. The apparatus of claim 1, comprising a digital display coupled to the processor circuit to present a user interface view.

13. A computer-implemented method comprising:
establishing, at a small cell evolved Node B (eNB) capable of operating in compliance with one or more 3rd Generation Partnership Project (3GPP) Long Term Evolution (LTE) standards including LTE-Advanced (LTE-A), a backhaul link with a macro cell eNB via an X2 interface, the backhaul link established for the small cell eNB to serve as a secondary cell for one or more user equipment (UEs) while the macro cell eNB serves as a primary cell for the one or more UEs;
splitting protocol stack processing between the small cell eNB and the macro cell eNB for radio bearers associated with a connection between an UE and an evolved packet core (EPC) such that the small cell eNB performs protocol stack processing on a portion of protocol stack layers excluding a protocol data convergence protocol (PDCP) layer; and
receiving control information from the macro cell eNB through the backhaul link via the X2 interface to facilitate the protocol stack processing on the portion of protocol stack layers for a first portion of the radio bearers, the control information including a number of PDCP service data units (SDUs) not processed before a re-establishment procedure implemented at the macro cell eNB during a given transmission time interval (TTI).

14. The computer-implemented method of claim 13, comprising the protocol stack layers including the PDCP layer, a radio link control (RLC) layer, a media access control (MAC) layer and a physical (PHY) layer.

15. The computer-implemented method of claim 14, comprising the small cell eNB performs protocol stack processing on the RLC layer, the MAC layer and the PHY layer.

16. The computer-implemented method of claim 14, comprising the small cell eNB performs protocol stack processing on the MAC layer and the PHY layer.

17. The computer-implemented method of claim 13, comprising:
   establishing, at the small cell eNB, a second backhaul link with a second macro cell eNB via the X2 interface, the second backhaul link established for the small cell eNB to serve as a secondary cell for at least one UE while the second macro cell eNB serves as a primary cell for the at least one UE;
   splitting protocol stack processing between the small cell eNB and the second macro cell eNB for second radio bearers associated with a second connection between a second UE and the EPC such that the small cell eNB performs protocol stack processing on the portion of protocol stack layers that excludes the PDCP layer; and
   receiving second control information from the second macro cell eNB through the second backhaul link via the X2 interface to facilitate the protocol stack processing on the portion of protocol stack layers for a first portion of the second radio bearers.

18. The computer-implemented method of claim 13, comprising the radio bearers associated with the connection between the UE and the EPC include a voice over internet protocol (VoIP) radio bearer, a video streaming radio bearer or a best-effort file transfer radio bearer.

19. At least one non-transitory machine readable medium comprising a plurality of instructions that in response to being executed on a system for a macro cell evolved node B (eNB) capable of operating in compliance with one or more or more 3rd Generation Partnership Project (3GPP) Long Term Evolution (LTE) standards including LTE-Advanced (LTE-A) causes the system to:
   establish a backhaul link with a small cell eNB via an X2 interface, the backhaul link established for the small cell eNB to serve as a secondary cell for one or more user equipment (UEs) while the macro cell eNB serves as a primary cell for the one or more UEs;
   split protocol stack processing between the macro cell eNB and the small cell eNB for radio bearers associated with a connection between an UE and an evolved packet core (EPC) such that the macro cell eNB performs protocol stack processing on all protocol stack layers for a first portion of the radio bearers and performs protocol stack processing on a portion of protocol stack layers for a second portion of the radio bearers, the portion of protocol stack layers including a protocol data convergence protocol (PDCP) layer; and
   forward control information to the small cell eNB through the backhaul link via the X2 interface to facilitate the small cell eNB performing protocol stack processing on the portion of protocol stack layers for the second portion of radio bearers, the control information including a number of PDCP service data units (SDUs) not processed before a re-establishment procedure implemented during a given transmission time interval (TTI).

20. The at least one non-transitory machine readable medium of claim 19, comprising the protocol stack layers including the PDCP layer, a radio link control (RLC) layer, a media access control (MAC) layer and a physical (PHY) layer.

21. The at least one non-transitory machine readable medium of claim 20, comprising the macro cell eNB to perform protocol stack processing on only the PDCP layer for the second portion of radio bearers.

22. The at least one non-transitory machine readable medium of claim 21, comprising the control information forwarded to the small cell eNB for the second portion of radio bearers responsive to at least one of a given transmission time interval (TTI), a periodic time period that is static and pre-defined, a periodic time period that is dynamic or an event-based trigger, the control information including a number of PDCP control protocol data units (PDUs), or a number of PDCP PDUs not yet transferred to the RLC layer to be processed at the small cell eNB.

23. The at least one non-transitory machine readable medium of claim 20, comprising the macro cell eNB to perform protocol stack processing on both the PDCP layer and the RLC layer.

24. The at least one non-transitory machine readable medium of claim 23, comprising the control information forwarded to the small cell eNB for the second portion of radio bearers responsive to at least one of a given transmission time interval (TTI), a periodic time period that is static and pre-defined, a periodic time period that is dynamic or an event-based trigger, the control information including a number and size of RLC service data units (SDUs) not yet processed by the RLC layer at the macro cell eNB, an estimate of a number and size of status protocol data units (PDUs) to be transmitted, a number of PDCP control PDUs, or a number of PDCP PDUs not yet transferred to the RLC layer.

25. The at least one non-transitory machine readable medium of claim 19, the instructions to further cause the system to:
   split the protocol stack processing between the macro cell eNB and the small cell eNB for second radio bearers associated with a second connection between a second UE and the EPC such that the macro cell eNB performs protocol stack processing on all protocol stack layers for a first portion of the second radio bearers and performs protocol stack processing on a portion of protocol stack layers for a second portion of the second radio bearers, the portion of protocol stack layers including the PDCP layer; and
   forward additional control information to the small cell eNB through the backhaul link via the X2 interface to facilitate protocol stack processing by the small cell eNB on the portion of protocol stack layers for the first portion of the second radio bearers.

* * * * *